(12) United States Patent
Salehifar et al.

(10) Patent No.: US 11,843,786 B2
(45) Date of Patent: *Dec. 12, 2023

(54) MATRIX-BASED INTRA PREDICTION DEVICE AND METHOD

(71) Applicant: LG Electronics Inc., Seoul (KR)

(72) Inventors: Mehdi Salehifar, Seoul (KR);
Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,732

(22) Filed: Jan. 9, 2023

(65) Prior Publication Data

US 2023/0164326 A1 May 25, 2023

Related U.S. Application Data

(63) Continuation of application No. 17/527,951, filed on Nov. 16, 2021, now Pat. No. 11,589,057, which is a
(Continued)

(51) Int. Cl.
*H04N 19/159* (2014.01)
*H04N 19/132* (2014.01)
(Continued)

(52) U.S. Cl.
CPC ......... *H04N 19/159* (2014.11); *H04N 19/132* (2014.11); *H04N 19/176* (2014.11); *H04N 19/593* (2014.11); *H04N 19/70* (2014.11)

(58) Field of Classification Search
CPC .... H04N 19/132; H04N 19/159; H04N 19/11; H04N 19/59; H04N 19/70; H04N 19/593
See application file for complete search history.

(56) References Cited

U.S. PATENT DOCUMENTS

| 8,194,749 | B2 | 6/2012 | Kim et al. | |
| 2013/0114695 | A1* | 5/2013 | Joshi | H04N 19/463 375/240.03 |

(Continued)

FOREIGN PATENT DOCUMENTS

| JP | 2014147111 A | 8/2014 |
| KR | 20170131473 A | 11/2017 |

(Continued)

OTHER PUBLICATIONS

Benjamin Bross et al., "Versatile Video Coding (Draft 4)", Editors, Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M1001-v5, 295 pages.
(Continued)

*Primary Examiner* — Mainul Hasan
(74) *Attorney, Agent, or Firm* — Bryan Cave Leighton Paisner LLP

(57) ABSTRACT

An image decoding method according to the present document can comprise the steps of: on the basis of first flag information indicating whether or not matrix-based intra prediction (MIP) can be applied to a current block, receiving second flag information indicating whether or not the MIP is used for the current block; receiving matrix-based intra prediction (MIP) mode information on the basis of the second flag information; generating intra prediction samples for the current block on the basis of the MIP mode information; and generating reconstructed samples for the current block on the basis of the intra prediction samples.

8 Claims, 20 Drawing Sheets

Related U.S. Application Data continuation of application No. PCT/KR2020/007221, filed on Jun. 3, 2020.

(60) Provisional application No. 62/856,715, filed on Jun. 3, 2019.

(51) Int. Cl.
  H04N 19/176 (2014.01)
  H04N 19/593 (2014.01)
  H04N 19/70 (2014.01)

(56) References Cited

U.S. PATENT DOCUMENTS

| | | |
|---|---|---|
| 2018/0048896 A1 | 2/2018 | Park et al. |
| 2018/0332312 A1 | 11/2018 | Liu et al. |
| 2020/0344468 A1* | 10/2020 | Lin .................. H04N 19/105 |
| 2020/0359050 A1* | 11/2020 | Van der Auwera .... H04N 19/42 |
| 2021/0195176 A1* | 6/2021 | Kim .................. H04N 19/176 |
| 2021/0321090 A1* | 10/2021 | Deng .................. H04N 19/60 |

FOREIGN PATENT DOCUMENTS

| | | | | |
|---|---|---|---|---|
| WO | WO-2020207500 A1 * | 10/2020 | ........... | H04N 19/105 |
| WO | WO-2020211765 A1 * | 10/2020 | ............. | H04N 19/11 |
| WO | WO-2020239017 A1 * | 12/2020 | ........... | H04N 19/593 |
| WO | WO-2020239018 A1 * | 12/2020 | ............. | G06F 17/16 |

OTHER PUBLICATIONS

Benjamin Bross et al., "Versatile Video Coding (Draft 4)", Editors, Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M1001-v7, 310 pages.

Jonathan Pfaff et al., "CE3: Affine linear weighted intra prediction (CE3-4.1, CE3-4.2)", Fraunhofer HHI, Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0217, 427 pages.

Benjamin Bross et al., "Versatile Video Coding (Draft 5)", Editors, Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v8, 475 pages.

Medhi Salehifar et al., "CE3 Related: No. MPM Derivation for Matrix Based Intra Prediction (MIP)", LG Electronics, Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0169-V2, 10 pages.

B. Bross et al., "Versatile Video Coding (Draft 5)", Joint Video Experts Team (JVET) of ITU-T SG 16 WP 3 and ISO/IEC JTC 1/SC 29/WG 11, Mar. 19-27, 2019, JVET-N1001-v7.

J. Chen et al., "Algorithm description for Versatile Video Coding and Test Model 5 (VTM 5)", Joint Video Experts Team (JVET) of ITU-T SG 16 WP 3 and ISO/IEC JTC 1/SC 29/WG 11, Mar. 19-27, 2019, JVET-N1002-v1.

M. Salehifar et al., "CE3 Related: Low Memory and Computational Complexity Matrix Based Intra Prediction (MIP)", Joint Video Experts Team (JVET) of ITU-T SG 16 WP 3 and ISO/IEC JTC 1/SC 29/WG 11, Jul. 3-12, 2019, JVET-O0139.

M. Salehifar et al., "CE3 Related: No MPM Derivation for Matrix Based Intra Prediction (MIP)", Joint Video Experts Team (JVET) of ITU-T SG 16 WP 3 and ISO/IEC JTC 1/SC 29/WG 11, Jul. 3-12, 2019, JVET-O0169.

G. Sullivan et al., "Meeting Report of the 15th Meeting of the Joint Video Experts Team (JVET), Gothenburg, SE, Jul. 3-12, 2019", Joint Video Experts Team (JVET) of ITU-T SG 16 WP 3 and ISO/IEC JTC 1/SC 29/WG 11, Jul. 3-12, 2019, JVET-O2000.

J. Choi et al., "Non-CE3: Simplified mode mapping in MIP", Joint Video Experts Team (JVET) of ITU-T SG 16 WP 3 and ISO/IEC JTC 1/SC 29/WG 11, Jul. 3-12, 2019, JVET-O0396-v2.

J. Choi et al., "Non-CE3: MIP mode reduction", Joint Video Experts Team (JVET) of ITU-T SG 16 WP 3 and ISO/IEC JTC 1/SC 29/WG 11, Jul. 3-12, 2019, JVET-O0397.

J. Pfaff, et al., "Non-CE3: Simplifications of MIP", Joint Video Experts Team (JVET) of ITU-T SG 16 WP 3 and ISO/IEC JTC 1/SC 29/WG 11, Jul. 3-12, 2019, JVET-O0925-r1.

Jonathan Pfaff, et al., "E3: Affine linear weighted intra prediction (CE3-4.1, CE3-4.2)", Joint Video Experts Team (JVET) of ITU-T SG 16 WP 3 and ISO/IEC JTC 1/SC 29/WG 11, 14th Meeting: Geneva, CH, Mar. 19-27, 2019. JVET-N0217.

* cited by examiner

FIG. 18
For each index i:
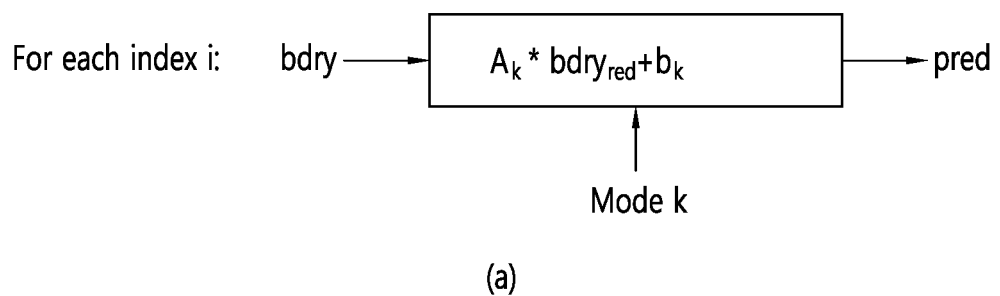
(a)
For all indexes:
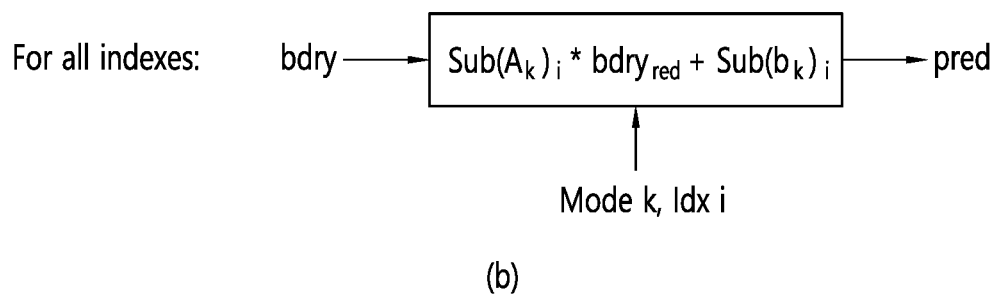
(b)

MATRIX-BASED INTRA PREDICTION DEVICE AND METHOD

This is a Continuation Application of U.S. patent application Ser. No. 17/527,951, filed Nov. 16, 2021, which is a Bypass of PCT Application No. PCT/KR2020/007221, with an international filing date of Jun. 3, 2020, which claims the benefit of U.S. Provisional Application No. 62/856,715, filed on Jun. 3, 2019, all of which are incorporated by reference in their entirety herein.

TECHNICAL FIELD

The present disclosure relates to an image coding technique and, more particularly, to an image coding technique for a matrix-based intra prediction apparatus and a matrix-based intra prediction.

RELATED ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present disclosure is to provide an efficient intra prediction method and an efficient intra prediction apparatus.

Still another technical aspect of the present disclosure is to provide an image coding method and an image coding apparatus for matrix-based intra prediction.

Yet another technical aspect of the present disclosure is to provide an image coding method and an image coding apparatus for coding mode information on matrix-based intra prediction.

According to an embodiment of the present disclosure, there is provided an image decoding method performed by a decoding apparatus. The method may include: receiving second flag information indicating whether matrix-based intra prediction (MIP) is used for a current block based on first flag information indicating whether the MIP is enabled to the current block; receiving matrix-based intra prediction (MIP) mode information based on the second flag information; generating intra prediction samples for the current block based on the MIP mode information and the size of the current block; and generating reconstructed samples for the current block based on the intra prediction samples.

The first flag information is signaled through sequence parameter set (SPS) syntax information and the second flag information is signaled through coding unit syntax information.

The MIP mode information may be index information indicating an MIP mode applied to the current block.

The generating of the intra prediction samples may include: deriving reduced boundary samples by downsampling reference samples adjacent to the current block; deriving reduced prediction samples based on a multiplication operation of the reduced boundary samples and an MIP matrix; and generating the intra prediction samples for the current block by upsampling the reduced prediction samples.

The reduced boundary samples may be downsampled by averaging the reference samples, and the intra prediction samples may be upsampled by linear interpolation of the reduced prediction samples.

The MIP matrix may be derived based on the size of the current block and the index information.

The MIP matrix may be selected from any one of three matrix sets classified according to the size of the current block, and each of the three matrix sets may include a plurality of MIP matrices.

According to another embodiment of the present disclosure, there is provided an image encoding method performed by an encoding apparatus. The method may include: deriving whether matrix-based intra prediction (MIP) is applied to a current block; deriving an intra prediction sample for the current block based on the MIP when the MIP is applied to the current block; deriving residual samples for the current block based on the intra prediction sample; and encoding information on the residual samples and information on the MIP, wherein the information on the MIP may include first flag information indicating whether matrix-based intra prediction (MIP) is enabled to the current block and second flag information indicating whether the MIP is applied to the current block and matrix-based intra prediction (MIP) mode information.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

The present disclosure may have various effects. For example, according to an embodiment of the present disclosure, it is possible to increase overall image/video compression efficiency. Further, according to an embodiment of the present disclosure, it is possible to reduce implementation complexity and to enhance prediction performance through efficient intra prediction, thereby improving overall coding efficiency. In addition, according to an embodiment of the disclosure, when performing matrix-based intra prediction, it is possible to efficiently code index information indicating the matrix-based intra prediction, thereby improving coding efficiency.

Effects that can be obtained through detailed examples in the description are not limited to the above-mentioned effects. For example, there may be various technical effects that can be understood or induced from the description by a person having ordinary skill in the related art. Accordingly, the detailed effects of the description are not limited to those explicitly described in the description, and may include various effects that can be understood or induced from the technical features of the description.

BRIEF DESCRIPTION OF THE DRAWINGS

FIG. 18 illustrates an MIP technique according to an embodiment of the present disclosure.

DESCRIPTION OF EXEMPLARY EMBODIMENTS

Figure 1:
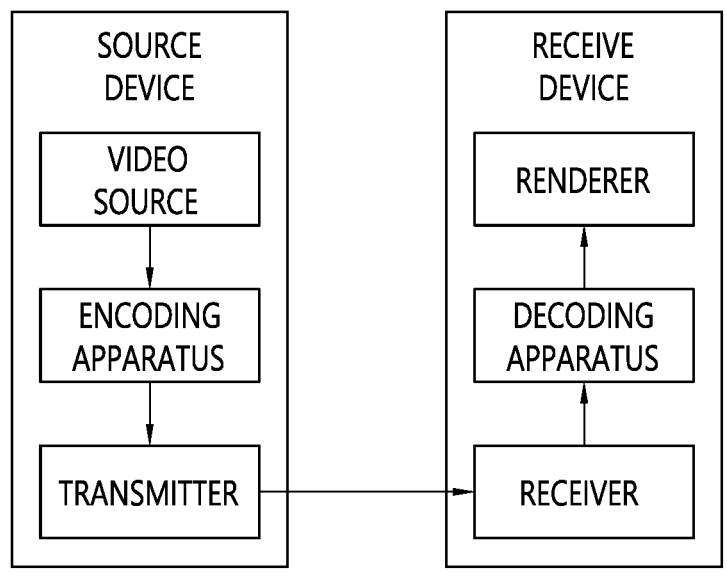
FIG. 1 schematically illustrates an example of a video/image coding system to which embodiments of the present disclosure are applicable.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, the term "A or B" may mean "only A", "only B", or "both A and B". In other words, in this document, the term "A or B" may be interpreted to indicate "A and/or B". For example, in this document, the term "A, B or C" may mean "only A", "only B", "only C", or "any combination of A, B and C".

A slash "/" or a comma used in this document may mean "and/or". For example, "A/B" may mean "A and/or B". Accordingly, "A/B" may mean "only A", "only B", or "both A and B". For example, "A, B, C" may mean "A, B or C".

In this document, "at least one of A and B" may mean "only A", "only B", or "both A and B". Further, in this document, the expression "at least one of A or B" or "at least one of A and/or B" may be interpreted the same as "at least one of A and B".

Further, in this document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in this document may mean "for example". Specifically, in the case that "prediction (intra prediction)" is expressed, it may be indicated that "intra prediction" is proposed as an example of "prediction". In other words, the term "prediction" in this document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In this document, technical features individually explained in one drawing may be individually implemented, or may be simultaneously implemented.

This document relates to video/image coding. For example, the methods/embodiments disclosed in this document may be applied to a method disclosed in the versatile video coding (VVC), the essential video coding (EVC) standard, the AOMedia Video 1 (AV1) standard, the 2nd generation of audio video coding standard (AVS2), or the next generation video/image coding standard (e.g., H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may be composed of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (a source device) and a second device (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
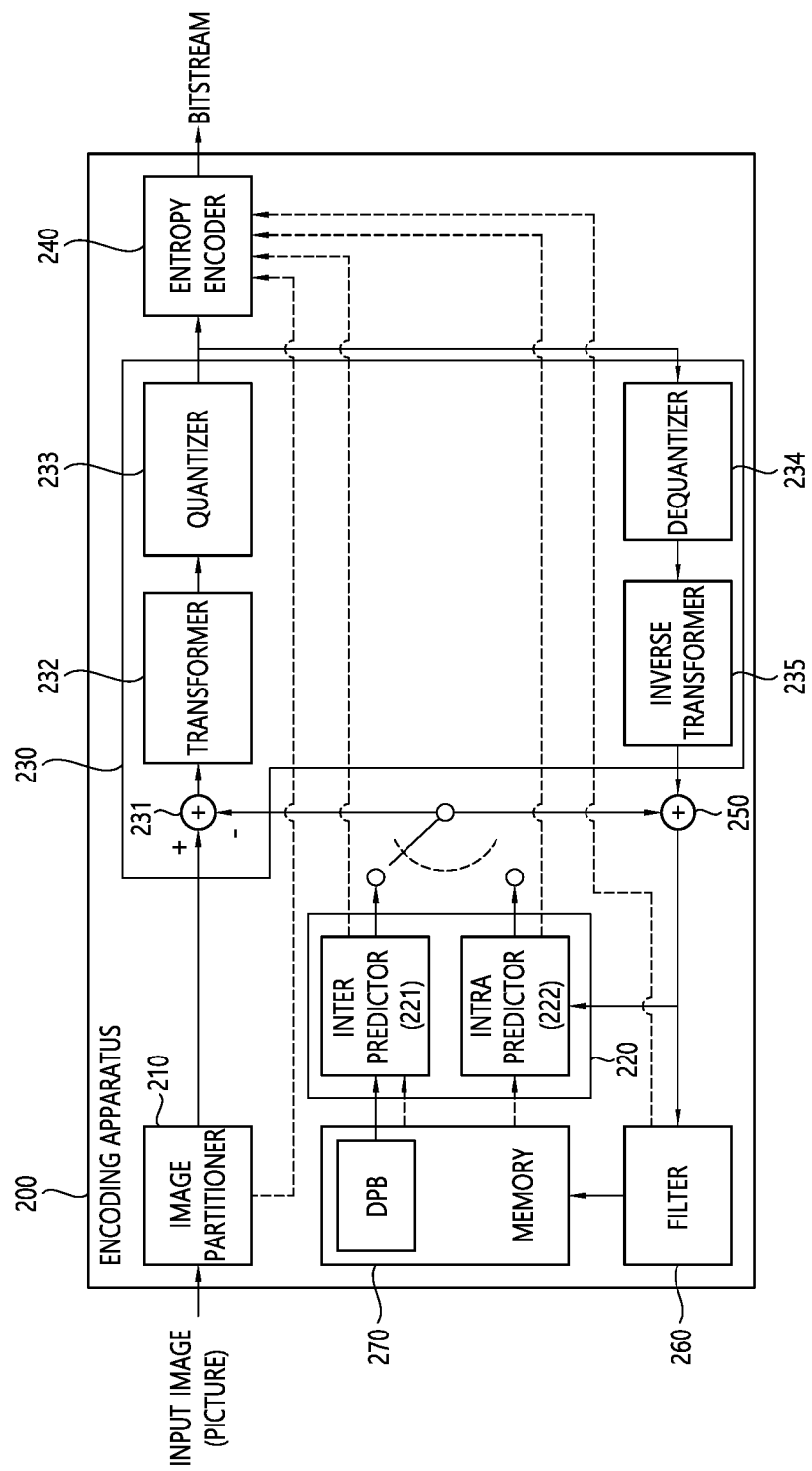
FIG. 2 schematically illustrates a configuration of a video/image encoding apparatus to which embodiments of the present disclosure are applicable.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processing units. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoding apparatus 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may construct a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
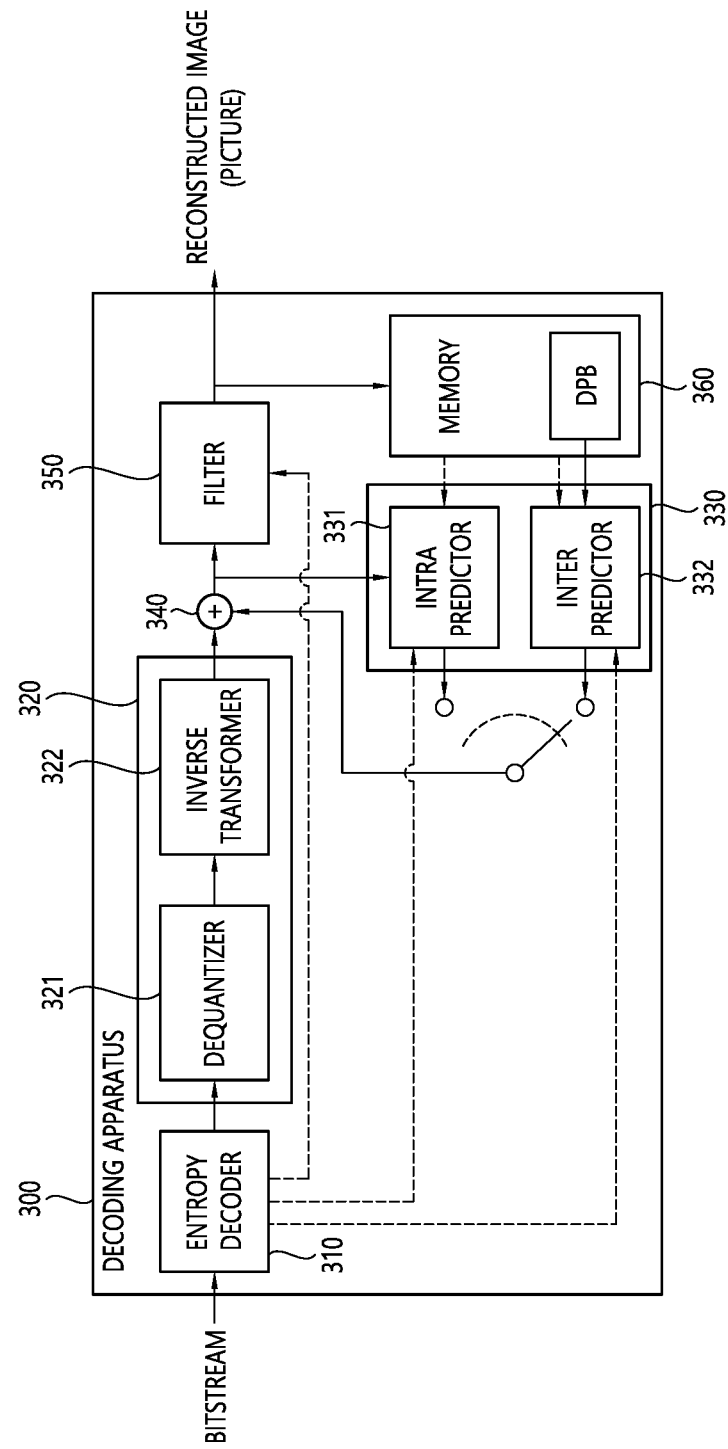
FIG. 3 schematically illustrates a configuration of a video/image decoding apparatus to which embodiments of the present disclosure are applicable.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may construct a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called a reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In this document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Figure 4:
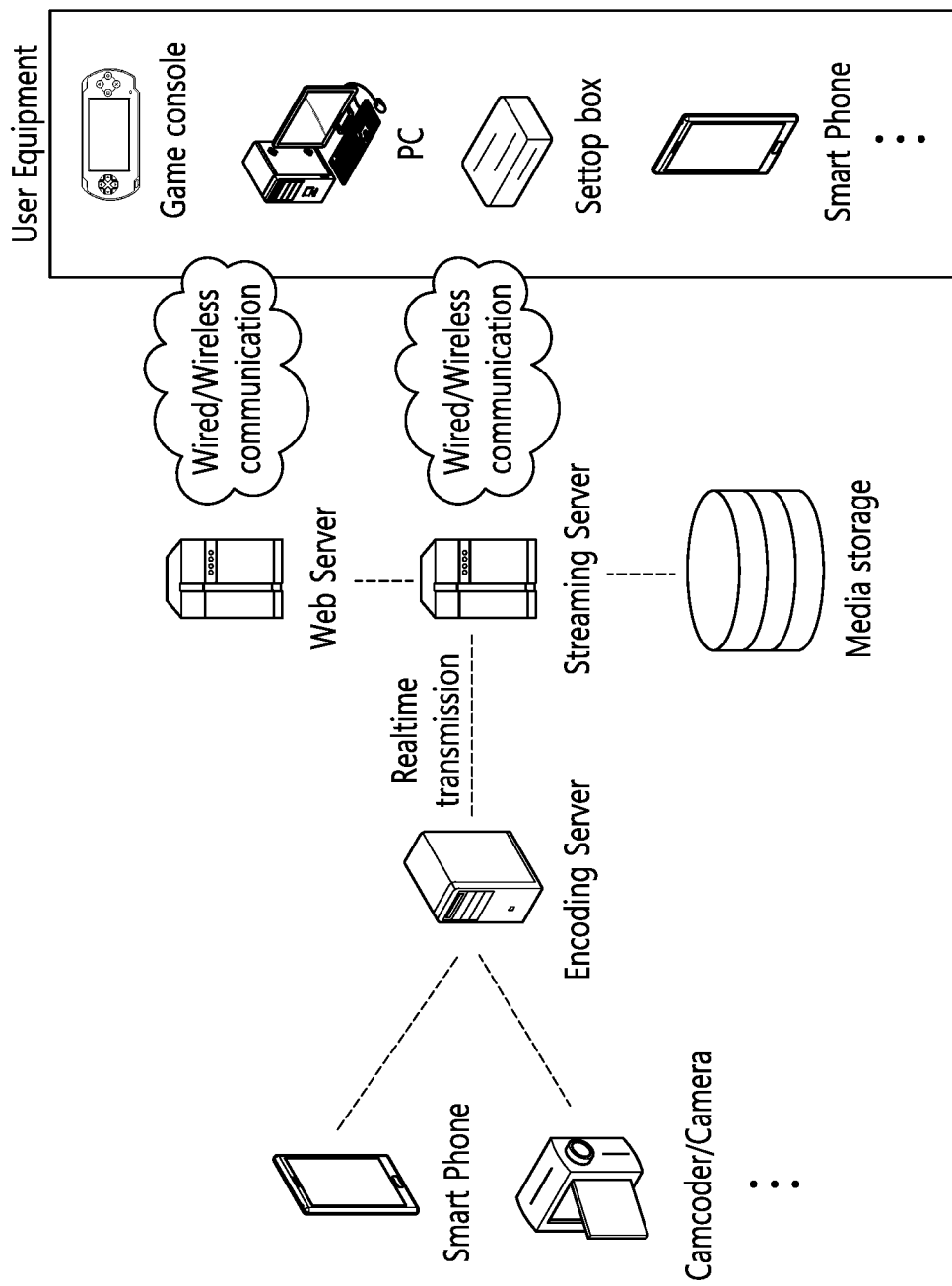
FIG. 4 illustrates an example of a content streaming system to which embodiments of the present disclosure are applicable.

FIG. 4 illustrates an example of a content streaming system to which embodiments disclosed in this document may be applied.

Referring to FIG. 4 the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

Figure 5:
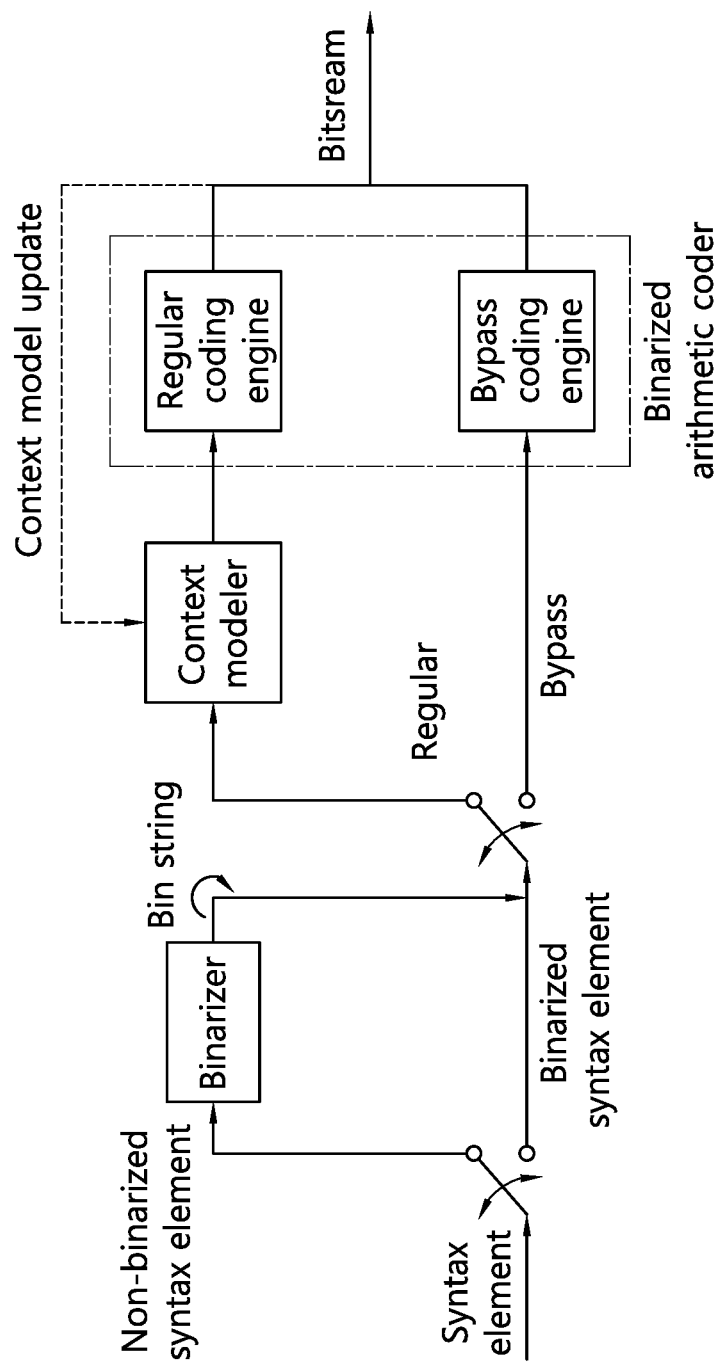
FIG. 5 illustrates context-adaptive binary arithmetic coding (CABAC) for encoding a syntax element.

FIG. 5 illustrates context-adaptive binary arithmetic coding (CABAC) for encoding a syntax element. For example, in an encoding process of CABAC, the encoding apparatus may convert an input signal to a binary value through binarization when the input signal is a syntax element rather than a binary value. When the input signal is an already binary value (that is, the value of the input signal is a binary value), the input signal is bypassed without binarization. Here, each binary 0 or 1 forming the binary value may be referred to as a bin. For example, when a binary string resulting from the binarization is 110, each of 1, 1, and 0 is called one bin. The bin(s) for one syntax element may indicate the value of the syntax element. The binarization may be based on various binarization methods, such as a truncated Rice binarization process and a fixed-length binarization process, and a binarization method for a target syntax element may be predefined. This binarization procedure may be performed by a binarizer in the entropy encoder.

The binarized bins of the syntax element may be input to a regular coding engine or a bypass coding engine. The regular coding engine of the encoding apparatus may assign a context model that reflects a probability value for the bins and may encode the bins based on the assigned context model. The regular coding engine of the encoding apparatus may encode on each bin and may then update the context model for the bin. These encoded bins may be referred to as context-coded bins.

When the binarized bins of the syntax element are input to the bypass coding engine, the bins may be coded as follows. For example, the bypass coding engine of the encoding apparatus omits a procedure of estimating a probability for the input bins and a procedure of updating a probability model applied to the bins after encoding. When bypass encoding is applied, the encoding apparatus may encode the input bits by applying a uniform probability distribution instead of assigning a context model, thus increasing encoding speed. These coded bins may be referred to as bypass bins.

Entropy decoding may be performed by the same process as entropy encoding described above in reverse order.

The decoding apparatus (entropy decoder) may decode encoded image/video information. The image/video information may include partitioning-related information, prediction-related information (e.g., inter/intra prediction classification information, intra prediction mode information, and inter prediction mode information), residual information, in-loop filtering-related information, and the like, or may include various syntax elements relating thereto. The foregoing entropy coding may be performed in syntax element units.

The decoding apparatus may perform binarization on a target syntax element. Here, the binarization may be based on various binarization methods, such as a truncated Rice binarization process and a fixed-length binarization process, and a binarization method for the target syntax element may be predefined. The decoding apparatus may derive available bin strings (bin string candidates) for available values of the target syntax element through this binarization procedure. The binarization procedure may be performed by a binarizer in the entropy decoder.

The decoding apparatus sequentially decodes and parses individual bins for the target syntax element from an input bit(s) in a bitstream and compares a derived bin string with the available bin strings for the syntax element. When the derived bin string is the same as one of the available bin strings, a value corresponding to the bin string is derived as the value of the syntax element. Otherwise, the decoding apparatus further parses a next bit in the bitstream and performs the above procedure again. Through this process, specific information (specific syntax element) in the bitstream may be signaled using a variable-length bit without using a start bit or an end bit for the specific information. Accordingly, a smaller number of bits may be allocated to a lower value, and overall coding efficiency may be improved.

The decoding apparatus may perform context-based or bypass-based decoding on each bin in the bin string from the bitstream based on an entropy coding technique, such as CABAC or CAVLC.

When the syntax element is decoded based on a context model, the decoding apparatus may receive a bin corresponding to the syntax element through the bitstream, may determine the context model using the syntax element and decoding information on a block to be decoded or a neighboring block or information on a symbol/bin decoded in a previous step, and may derive the value of the syntax element by predicting the probability of the received bin occurring and performing arithmetic decoding of the bin according to the determined context model. Subsequently, a context model for a bin to be subsequently decoded may be updated to the determined context model.

A context model may be assigned and updated for each bin to be context-coded (regularly coded) and may be indicated based on ctxIdx or ctxInc. ctxIdx may be derived based on ctxInc. Specifically, for example, a context index (ctxIdx) indicating a context model for each regularly coded bin may be derived as the sum of a context index increment (ctxInc) and a context index offset (ctxIdxOffset). Here, different ctxInc may be derived for each bin. ctxIdxOffset may be expressed as the lowest value of ctxIdx. ctxIdxOffset is a value generally used for distinguishing from context models for other syntax elements, and a context model for one syntax element may be classified/derived based on ctxInc.

In entropy encoding, it may be determined whether to perform encoding through the regular coding engine or through the bypass encoding engine, and a coding path may be switched. Entropy decoding may be performed by the same process as encoding in reverse order.

For example, when the syntax element is subjected to bypass decoding, the decoding apparatus may receive the bin corresponding to the syntax element through the bitstream and may decode the input bin by applying a uniform probability distribution. In this case, the decoding apparatus may omit the procedure of deriving the context model for the syntax element and the procedure of updating the context model applied to the bin after decoding.

As described above, residual samples may be derived as quantized transform coefficients through transform and quantization processes. The quantized transform coefficients may also be referred to as transform coefficients. In this case, the transform coefficients within a block may be signaled in the form of residual information. The residual information may include a residual coding syntax. That is, the encoding apparatus may construct the residual coding syntax with the residual information, may encode the residual coding syntax, and may output residual coding syntax in the form of a bitstream, and the decoding apparatus may decode the residual coding syntax from the bitstream and may derive residual (quantized) transform coefficients. As described below, the residual coding syntax may include syntax elements indicating whether a transform is applied to the block, the position of the last significant transform coefficient in the block, whether there is a significant transform coefficient in a subblock, the size/code of a significant transform coefficient, and the like.

Meanwhile, if an intra prediction is performed, a correlation between samples may be used, and a difference between the original block and a prediction block, that is, a residual, may be obtained. The aforementioned transform and quantization may be applied to the residual. Accordingly, spatial redundancy can be reduced. Hereinafter, an encoding method and a decoding method using an intra prediction are specifically described.

An intra prediction refers to a prediction for generating prediction samples for a current block based on reference samples outside the current block within a picture (hereinafter a current picture) including the current block. In this case, the reference samples outside the current block may refer to samples adjacent to the current block. If an intra prediction is applied to the current block, neighboring reference samples to be used for the intra prediction of the current block may be derived.

For example, when the size (width×height) of a current block is nW×nH, neighboring reference samples of the current block may include a sample neighboring the left boundary and a total of 2×nH samples neighboring the bottom left of the current block, a sample neighboring the top boundary and a total of 2×nW samples neighboring the top right of the current block, and one sample neighboring the left top of the current block. Alternatively, neighboring reference samples of a current block may also include a plurality of columns of top neighboring samples and a plurality of rows of left neighboring samples. Furthermore, neighboring reference samples of a current block may also include a total of nH samples neighboring the right boundary of the current block having an nW×nH size, a total of nW samples neighboring the bottom boundary of the current block and one sample neighboring the bottom right of the current block.

In this case, some of the neighboring reference samples of the current block have not been decoded or may not be available. In this case, the decoding apparatus may configure neighboring reference samples to be used for a prediction by substituting unavailable samples with available samples. Alternatively, neighboring reference samples to be used for a prediction may be constructed through the interpolation of available samples.

If neighboring reference samples are derived, (i) a prediction sample may be derived based on an average or interpolation of the neighboring reference samples of a current block, and (ii) a prediction sample may be derived based on a reference sample present in a specific (prediction) direction for the prediction sample among neighboring reference samples of a current block. (i) may be applied when an intra prediction mode is a non-directional mode or a non-angular mode. (ii) may be applied when an intra prediction mode is a directional mode or an angular mode.

Further, the prediction sample may also be generated by the interpolation between a first neighboring sample positioned in a prediction direction of the intra prediction mode of the current block and a second neighboring sample positioned in an opposite direction of the prediction direction based on the prediction sample of the current block among the neighboring reference samples. The aforementioned case may be called a linear interpolation intra prediction (LIP). Further, chroma prediction samples may also be generated based on luma samples using a linear model. This case may be called an LM mode.

Further, temporary prediction samples of the current block may be derived based on the filtered neighboring reference samples, and the prediction sample of the current block may also be derived by weighted-summing at least one reference sample, which is derived according to the intra prediction mode among conventional neighboring reference samples, that is, the neighboring reference samples not filtered, and the temporary prediction sample. The aforementioned case may be called a position dependent intra prediction (PDPC).

Further, the prediction sample may be derived using the reference sample positioned in a prediction direction in a corresponding line by selecting a reference sample line with the highest prediction accuracy among the neighboring multiple reference sample lines of the current block, and an intra prediction encoding may be performed by a method for indicating (signaling) the reference sample line used at this time to the decoding apparatus. The aforementioned case may be called multiple reference line (MRL) intra prediction or intra prediction based on the MRL.

Further, the intra prediction may be performed based on the same intra prediction mode by splitting the current block into vertical or horizontal sub-partitions, and the neighboring reference samples may be derived and used in units of sub-partition. That is, in this case, the intra prediction mode for the current block is equally applied to the sub-partitions, and the neighboring reference sample may be derived and used in units of sub-partition, thereby enhancing intra prediction performance in some cases. Such a prediction method may be called intra sub-partitions (ISP) intra prediction or intra prediction based on the ISP.

The aforementioned intra prediction methods may be called an intra prediction type separately from the intra prediction mode. The intra prediction type may be called various terms such as an intra prediction technique or an additional intra prediction mode. For example, the intra prediction type (or the additional intra prediction mode or the like) may include at least one of the aforementioned LIP, PDPC, MRL, and ISP. A general intra prediction method other than specific intra prediction types such as the LIP, the PDPC, the MRL, and the ISP may be called a normal intra prediction type. The normal intra prediction type may be generally applied if the specific intra prediction type is not applied, and the prediction may be performed based on the aforementioned intra prediction mode. Meanwhile, a post-processing filtering for the derived prediction sample may also be performed if necessary.

In addition to the aforementioned intra prediction types, matrix-based intra prediction (hereinafter, MIP) maybe used as a method for intra prediction. The MIP may be referred to as affine linear weighted intra prediction (ALWIP) or matrix weighted intra prediction (MWIP).

When the MIP is applied to the current block, prediction samples for the current block may be derived by ii) performing a matrix-vector multiplication process i) using neighboring reference samples that have been subjected to an averaging process and (iii) further performing a horizontal/vertical interpolation process if necessary. Intra prediction modes used for the MIP may be differently configured from intra prediction modes used in the aforementioned LIP, PDPC, MRL, or ISP intra prediction or used in the normal intra prediction.

An intra prediction mode for the MIP may be referred to as an affine linear weighted intra prediction mode or a matrix-based intra prediction mode. For example, a matrix and an offset used in matrix-vector multiplication may be differently configured depending on the intra prediction mode for the MIP. Here, the matrix may be referred to as a (affine) weighted matrix, and the offset may be referred to as an (affine) offset vector or a (affine) bias vector. In the present disclosure, the intra prediction mode for the MIP may be referred to as an MIP intra prediction mode, a linear weighted intra prediction mode, a matrix-weighted intra prediction mode, or a matrix-based intra prediction mode. A specific MIP method will be described later.

The drawings below have been prepared to explain specific examples of this document. Since titles of specific devices described in the drawings or specific terms or titles (e.g., syntax title or the like) are exemplarily presented, the technical features of this document are not limited to the specific titles used in the drawings below.

Figure 6:
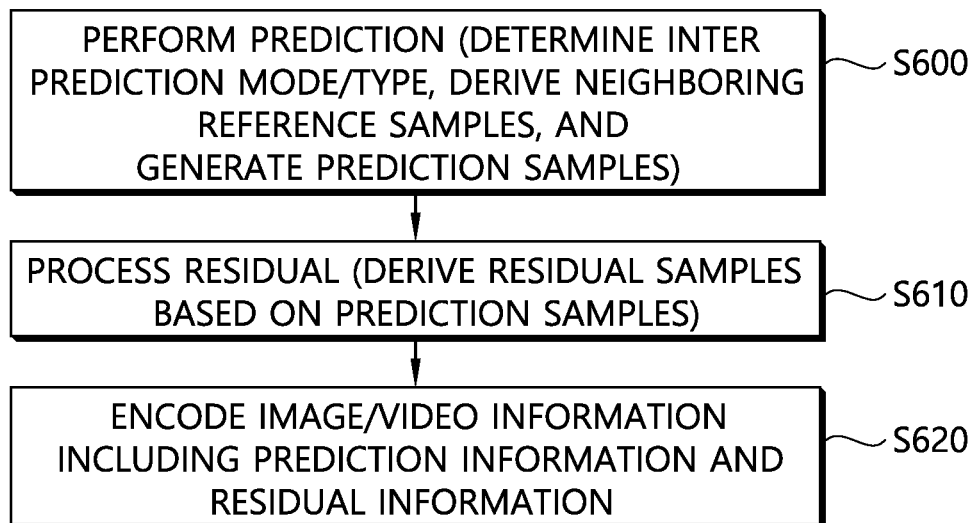
FIG. 6 schematically illustrates an example of an image encoding method based on intra prediction to which embodiments of the present disclosure are applicable.

FIG. 6 schematically illustrates an example of an image encoding method based on intra prediction to which the exemplary embodiments of the present document are applicable.

Referring to FIG. 6, S600 may be performed by the intra predictor 222 of the encoding apparatus, and S610 may be performed by the residual processor 230 of the encoding apparatus. Specifically, S610 may be performed by the subtractor 231 of the encoding apparatus. In S620, prediction information may be derived by the intra predictor 222, and encoded by the entropy encoder 240. In S620, residual information may be derived by the residual processor 230, and encoded by the entropy encoder 240. The residual information indicates information on the residual samples. The residual information may include information on quantized transform coefficients for the residual samples. As described above, the residual samples may be derived by transform coefficients through the transformer 232 of the encoding apparatus, and the transform coefficients may be derived by quantized transform coefficients through the quantizer 233. The information on the quantized transform coefficients may be encoded by the entropy encoder 240 through a residual coding procedure.

The encoding apparatus performs the intra prediction for the current block (S600). The encoding apparatus may derive the intra prediction mode/type for the current block, derive the neighboring reference samples of the current block, and generate the prediction samples in the current block based on the intra prediction mode/type and the neighboring reference samples. Here, procedures of determining the intra prediction mode/type, deriving the neighboring reference samples, and generating the prediction samples may also be simultaneously performed, and any one procedure may also be performed earlier than other procedures.

Meanwhile, although not illustrated, if a prediction sample filtering procedure is performed, the intra predictor 222 may further include a prediction sample filter (not illustrated) as well. The encoding apparatus may determine a mode/a type applied to the current block among a plurality of intra prediction modes/types. The encoding apparatus may compare RD costs for the intra prediction modes/types and determine optimal intra prediction mode/type for the current block.

As described above, the encoding apparatus may also perform the prediction sample filtering procedure. The prediction sample filtering may be called a post filtering. Some or all of the prediction samples may be filtered by the prediction sample filtering procedure. The prediction sample filtering procedure may be omitted in some cases.

The encoding apparatus generates residual samples for the current block based on the (filtered) prediction samples (S610). The encoding apparatus may compare the prediction samples based on phases in original samples of the current block, and derive the residual samples.

The encoding apparatus may encode image information including the information on the intra prediction (prediction information) and the residual information on the residual samples (S620). The prediction information may include intra prediction mode information and intra prediction type information. The residual information may include a residual coding syntax. The encoding apparatus may derive the quantized transform coefficients by transforming/quantizing the residual samples. The residual information may include the information on the quantized transform coefficients.

The encoding apparatus may output the encoded image information in the form of a bitstream. The output bitstream may be delivered to the decoding apparatus through a storage medium or a network.

As described above, the encoding apparatus may generate the reconstructed picture (including reconstructed samples and reconstructed block). To this end, the encoding apparatus may derive (modified) residual samples by dequantizing/inversely transforming the quantized transform coefficients again. As described above, the reason of transforming/quantizing the residual samples and then dequantizing/inversely transforming them again is to derive the same residual samples as the residual samples derived by the decoding apparatus as described above. The encoding apparatus may generate the reconstructed block including the reconstructed samples for the current block based on the prediction samples and the (modified) residual samples. The reconstructed picture for the current picture may be generated based on the reconstructed block. As described above, an in-loop filtering procedure or the like may be further applied to the reconstructed picture.

Figure 7:
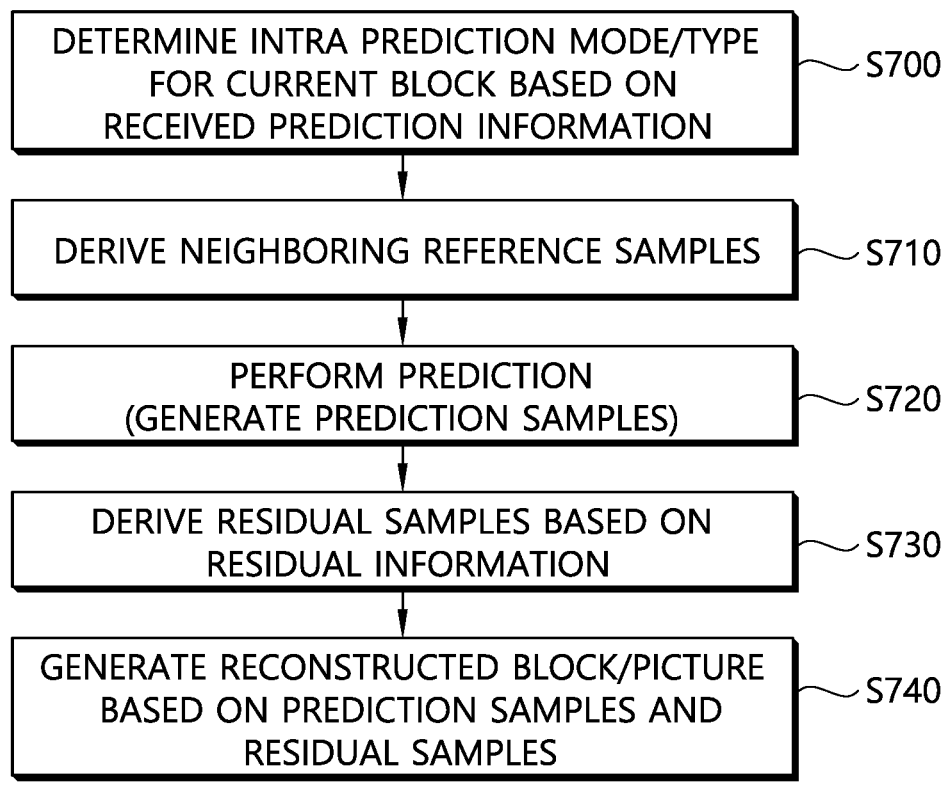
FIG. 7 schematically illustrates an example of an image decoding method based on intra prediction to which embodiments of the present disclosure are applicable.

FIG. 7 schematically illustrates an example of an image decoding method based on intra prediction to which the exemplary embodiments of the present document are applicable.

Referring to FIG. 7, the decoding apparatus may perform an operation corresponding to the aforementioned operation performed by the encoding apparatus. S700 to S720 may be performed by the intra predictor 331 of the decoding apparatus, and the prediction information in S700 and the residual information in S730 may be acquired from the bitstream by the entropy decoder 310 of the decoding apparatus. The residual processor 320 of the decoding apparatus may derive the residual samples for the current block based on the residual information. Specifically, the dequantizer 321 of the residual processor 320 may derive the transform coefficients by performing the dequantization, based on the quantized transform coefficients derived based on the residual information, and the inverse transformer 322 of the residual processor derive the residual samples for the current block by inversely transforming the transform coefficients. S640 may be performed by the adder 340 or the reconstructor of the decoding apparatus.

The decoding apparatus may derive the intra prediction mode/type for the current block based on the received prediction information (intra prediction mode/type information) (S700). The decoding apparatus may derive the neighboring reference samples of the current block (S710). The decoding apparatus generates the prediction samples in the current block based on the intra prediction mode/type and the neighboring reference samples (S720). In this case, the decoding apparatus may perform the prediction sample filtering procedure. The prediction sample filtering may be called the post filtering. Some or all of the prediction samples may be filtered by the prediction sample filtering procedure. The prediction sample filtering procedure may be omitted in some cases.

The decoding apparatus generates the residual samples for the current block based on the received residual information (S730). The decoding apparatus may generate the reconstructed samples for the current block based on the prediction samples and the residual samples, and derive the reconstructed block including the reconstructed samples (S740). The reconstructed picture for the current picture may be generated based on the reconstructed block. As described above, the in-loop filtering procedure or the like may be further applied to the reconstructed picture.

Meanwhile, although not illustrated, if the aforementioned prediction sample filtering procedure is performed, the intra predictor 331 may further include the prediction sample filter (not illustrated) as well.

Meanwhile, an intra prediction mode may include non-directional (or non-angular) intra prediction modes and directional (or angular) intra prediction modes. For example, in the HEVC standard, intra prediction modes including 2 non-directional prediction modes and 33 directional prediction modes are used. The non-directional prediction modes may include a planar intra prediction mode, that is, No. 0, and a DC intra prediction mode, that is, No. 1. The directional prediction modes may include No. 2 to No. 34 intra prediction modes. The planar mode intra prediction mode may be called a planar mode, and the DC intra prediction mode may be called a DC mode.

Figure 8:
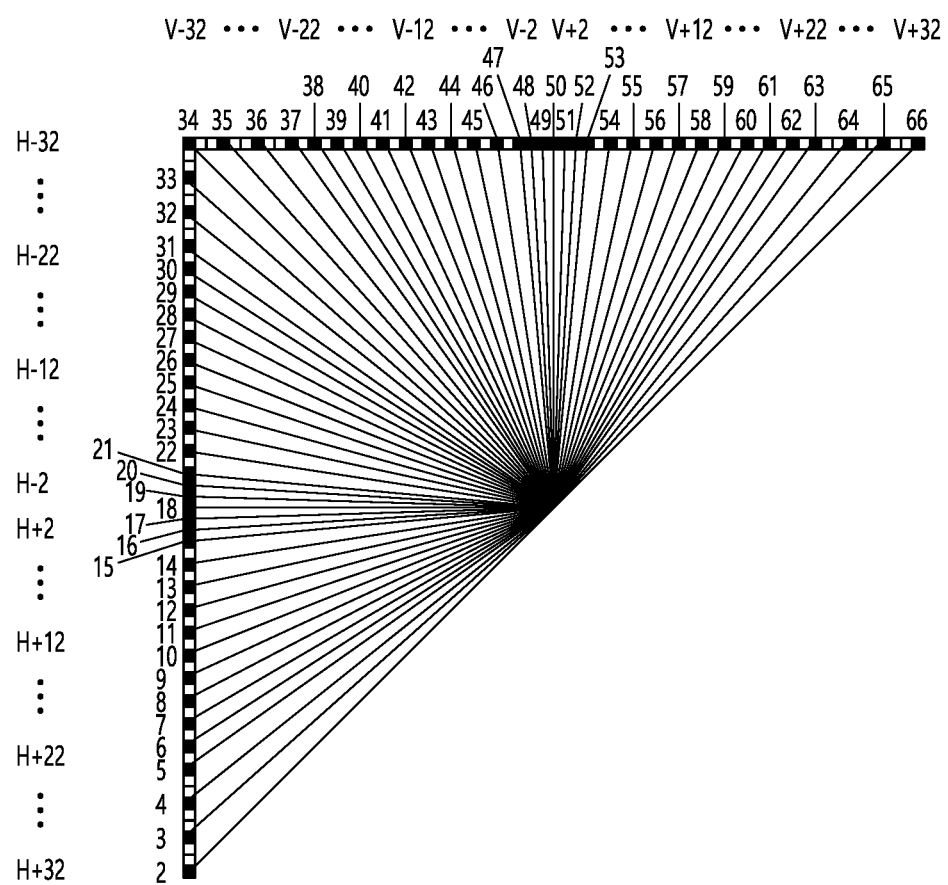
FIG. 8 illustrates an example of intra prediction modes to which embodiments of the present disclosure are applicable.

Alternatively, in order to capture a given edge direction proposed in natural video, the directional intra prediction modes may be extended from the existing 33 modes to 65 modes as in FIG. 8. In this case, the intra prediction modes may include 2 non-directional intra prediction modes and 65 directional intra prediction modes. The non-directional intra prediction modes may include a planar intra prediction mode, that is, No. 0, and a DC intra prediction mode, that is, No. 1. The directional intra prediction modes may include Nos. 2 to 66 intra prediction modes. The extended directional intra prediction modes may be applied to blocks having all sizes, and may be applied to both a luma component and a chroma component. However, this is an example, and embodiments of this document may be applied to a case where the number of intra prediction modes is different. A No. 67 intra prediction mode according to circumstances may be further used. The No. 67 intra prediction mode may indicate a linear model (LM) mode.

FIG. 8 illustrates an example of intra prediction modes to which the embodiment(s) of the present document may be applied.

Referring to FIG. 8, modes may be divided into intra prediction modes having horizontal directionality and intra prediction modes having vertical directionality based on a No. 34 intra prediction mode having a top left diagonal prediction direction. In FIG. 8, H and V mean horizontal directionality and vertical directionality, respectively. Each of numbers −32~32 indicate displacement of a 1/32 u nit on a sample grid position. The Nos. 2 to 33 intra prediction modes have horizontal directionality, and the Nos. 34 to 66 intra prediction modes have vertical directionality. The No. 18 intra prediction mode and the No. 50 intra prediction mode indicate a horizontal intra prediction mode and a vertical intra prediction mode, respectively. The No. 2 intra prediction mode may be called a bottom left diagonal intra prediction mode, the No. 34 intra prediction mode may be called a top left diagonal intra prediction mode, and the No. 66 intra prediction mode may be called a top right diagonal intra prediction mode.

The intra prediction mode information may include, for example, flag information (e.g., intra_luma_mpm_flag) indicating whether a most probable mode (MPM) is applied to the current block or whether a remaining mode is applied thereto. At this time, if the MPM is applied to the current block, the prediction mode information may further include index information (e.g., intra_luma_mpm_idx) indicating one of intra prediction mode candidates (MPM candidates). The intra prediction mode candidates (MPM candidates) may be composed of an MPM candidate list or an MPM list. Further, if the MPM is not applied to the current block, the intra prediction mode information may further include remaining mode information (e.g., intra_luma_mpm_remainder) indicating one of remaining intra prediction modes other than the intra prediction mode candidates (MPM candidates). The decoding apparatus may determine the intra prediction mode of the current block based on the intra prediction mode information.

Further, the intra prediction type information may be implemented in various forms. As an example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and which reference sample line is used if the MRL is applied, ISP flag information (e.g., intra_subpartitions_mode_flag) indicating whether the ISP is applied to the current block, ISP type information (e.g., intra_subpartitions_split_flag) indicating split types of the subpartitions if the ISP is applied, flag information indicating whether the PDCP is applied, or flag information indicating whether the LIP is applied. Further, the intra prediction type information may include an MIP flag indicating whether the MIP is applied to the current block.

The aforementioned intra prediction mode information and/or intra prediction type information may be encoded/decoded by the coding method described in the present document. For example, the aforementioned intra prediction mode information and/or intra prediction type information may be encoded/decoded by an entropy coding (e.g., CABAC, CAVLC) based on a truncated (rice) binary code.

Meanwhile, in case that intra prediction is applied, an intra prediction mode being applied to the current block may be determined using an intra prediction mode of a neighboring block. For example, the decoding apparatus may select one of mpm candidates in a most probable mode (mpm) list derived based on the intra prediction mode of the neighboring block (e.g., left and/or top neighboring block) of the current block and additional candidate modes based on a received mpm index, or may select one of the remaining intra prediction modes that are not included in the mpm candidates (and planar mode) based on the remaining intra prediction mode information. The mpm list may be constructed to include or not to include the planar mode as the candidate. For example, if the mpm list includes the planar mode as the candidate, the mpm list may have 6 candidates, whereas if the mpm list does not include the planar mode as the candidate, the mpm list may have 5 candidates. If the mpm list does not include the planar mode as the candidate, a not planar flag (e.g., intra_luma_not_planar_flag) indicating whether the intra prediction mode of the current block is not the planar mode may be signaled. For example, the mpm flag may be first signaled, and the mpm index and the not planar flag may be signaled when the value of the mpm flag is equal to 1. Further, the mpm index may be signaled when the value of the not planar flag is equal to 1. Here, constructing of the mpm list not to include the planar mode as the candidate is to first identify whether the intra prediction mode is the planar mode by first signaling the flag (not planar flag) since the planar mode is always considered as the mpm rather than that the planar mode is not the mpm.

For example, whether the intra prediction mode being applied to the current block is in the mpm candidates (and planar mode) or in the remaining modes may be indicated based on the mpm flag (e.g., intra_luma_mpm_flag). The mpm flag value of 1 may represent that the intra prediction mode for the current block is in the mpm candidates (and planar mode), and the mpm flag value of 0 may represent that the intra prediction mode for the current block is not in the mpm candidates (and planar mode). The not planar flag (e.g., intra_luma_not_planar_flag) value of 0 may represent that the intra prediction mode for the current block is the planar mode, and the not planar flag value of 1 may represent that the intra prediction mode for the current block is not the planar mode. The mpm index may be signaled in the form of mpm_idx or intra_luma_mpm_idx syntax elements, and the remaining intra prediction mode information may be signaled in the form of rem_intra_luma_pred_mode or intra_luma_mpm_remainder syntax elements. For example, the remaining intra prediction mode information may index the remaining intra prediction modes that are not included in the mpm candidates (and planar mode) among the entire intra prediction modes in the order of their prediction mode numbers, and may indicate one of them. The intra prediction mode may be the intra prediction mode for the luma component (sample). Hereinafter, the intra prediction mode information may include at least one of an mpm flag (e.g., intra_luma_mpm_flag), not planar flag (e.g., intra_luma_not_planar_flag), mpm index (e.g., mpm_idx or intra_luma_mpm_idx), and remaining intra prediction mode information (rem_intra_luma_pred_mode or intra_luma_mpm_remainder). In this document, the mpm list may be called various terms, such as an mpm candidate list, a candidate mode list (candModeList), and a candidate intra prediction mode list.

Generally, when a block for an image is split, a current block to be coded and a neighboring block have similar image properties. Therefore, the current block and the neighboring block are more likely to have the same or similar intra prediction modes. Therefore, the encoder may use the intra prediction mode of the neighboring block to encode the intra prediction mode of the current block. For example, the encoder/decoder may constitute a most probable modes (MPM) list for the current block. The MPM list may also be referred to as an MPM candidate list. Here, the MPM may mean a mode used for improving the coding efficiency in consideration of the similarity between the current block and the neighboring block upon coding the intra prediction mode.

Figure 9:
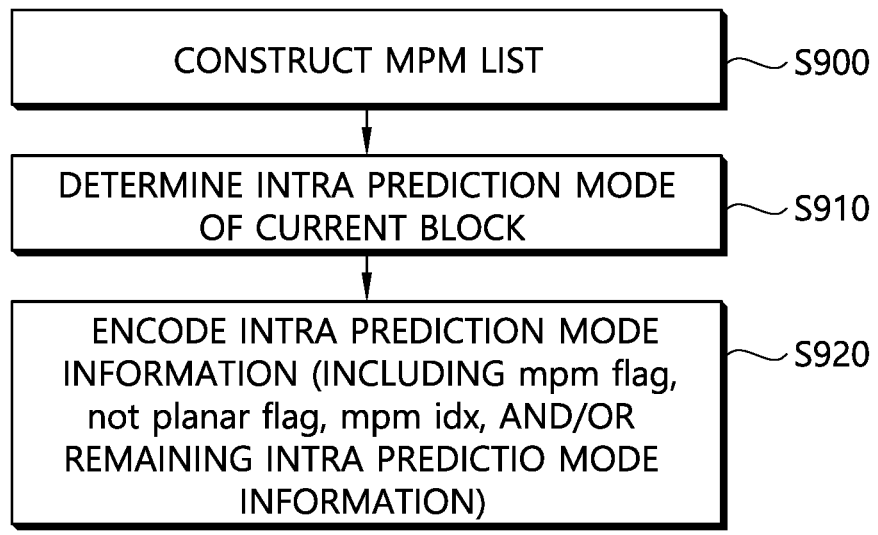
FIG. 9 illustrates an example of an intra prediction method based on an MPM in an encoding apparatus to which embodiments of the present disclosure are applicable.

FIG. 9 illustrates an example of an intra prediction method based on the MPM in the encoding apparatus to which the exemplary embodiments of the present document are applicable.

Referring to FIG. 9, the encoding apparatus constructs the MPM list for the current block (S900). The MPM list may include candidate intra prediction modes (MPM candidates) which are more likely applied to the current block. The MPM list may also include the intra prediction mode of the neighboring block, and further include specific intra prediction modes according to a predetermined method as well. A specific method for constructing the MPM list will be described later.

The encoding apparatus determines the intra prediction mode of the current block (S910). The encoding apparatus may perform the prediction based on various intra prediction modes, and determine an optimal intra prediction mode based on rate-distortion optimization (RDO) based on the above prediction. In this case, the encoding apparatus may also determine the optimal intra prediction mode using only the MPM candidates configured in the MPM list and a planar mode, or also determine the optimal intra prediction mode further using the remaining intra prediction modes as well as the MPM candidates configured in the MPM list and the planar mode.

Specifically, for example, if the intra prediction type of the current block is a specific type (e.g., LIP, MRL, or ISP) other than the normal intra prediction type, the encoding apparatus may determine the optimal intra prediction mode in consideration of only the MPM candidates and the planar mode as the intra prediction mode candidates for the current block. That is, in this case, the intra prediction mode for the current block may be determined only in the MPM candidates and the planar mode, and in this case, the mpm flag may be not encoded/signaled. In this case, the decoding apparatus may estimate that the mpm flag is 1 even without separate signaling of the mpm flag.

Generally, if the intra prediction mode of the current block is not the planar mode and is one of the MPM candidates in the MPM list, the encoding apparatus generates the mpm index (mpm idx) indicating one of the MPM candidates. If the intra prediction mode of the current block does not exist even in the MPM list, the encoding apparatus generates the remaining intra prediction mode information indicating a mode such as the intra prediction mode of the current block among the remaining intra prediction modes not included in the MPM list (and the planar mode).

The encoding apparatus may encode the intra prediction mode information to output it in the form of the bitstream (S920). The intra prediction mode information may include the aforementioned mpm flag, not planar flag, mpm index, and/or remaining intra prediction mode information. Generally, the mpm index and the remaining intra prediction mode information have an alternative relationship and are not simultaneously signaled when indicating the intra prediction mode for one block. That is, the value of the mpm flag, 1 and the not planar flag or the mpm index are signaled together, or the value of the mpm flag, 0 and the remaining intra prediction mode information are signaled together. However, as described above, if the specific intra prediction type is applied to the current block, the mpm flag is not signaled and only the not planar flag and/or the mpm index may also be signaled. That is, in this case, the intra prediction mode information may also include only the not planar flag and/or the mpm index.

Figure 10:
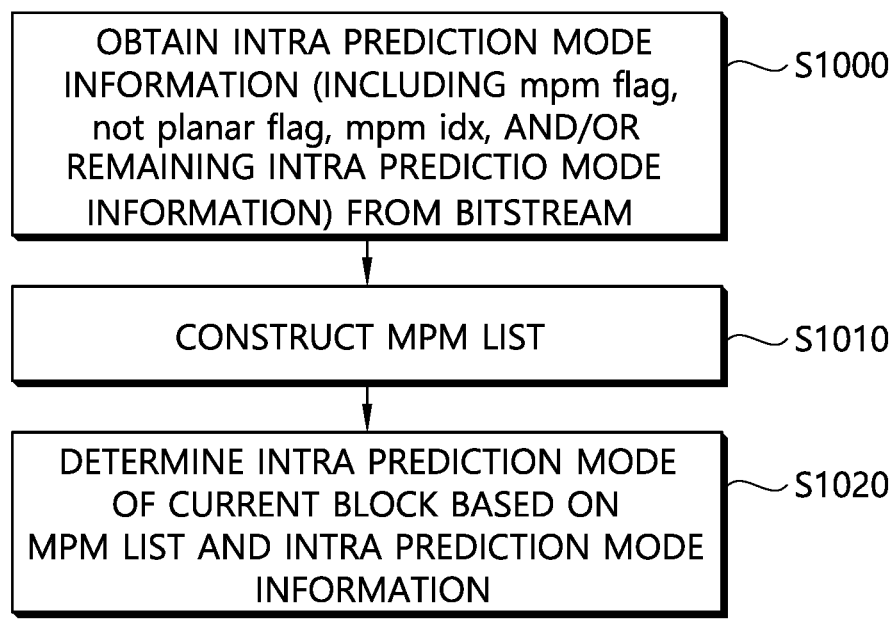
FIG. 10 illustrates an example of an intra prediction method based on an MPM in a decoding apparatus to which embodiments of the present disclosure are applicable.

FIG. 10 illustrates an example of the intra prediction method based on the MPM in the decoding apparatus to which the exemplary embodiments of the present document are applicable. The decoding apparatus illustrated in FIG. 10 may determine the intra prediction mode corresponding to the intra prediction mode information determined and signaled by the encoding apparatus illustrated in FIG. 8.

Referring to FIG. 10, the decoding apparatus obtains the intra prediction mode information from the bitstream (S1000). As described above, the intra prediction mode information may include at least one of the mpm flag, the not planar flag, the mpm index, and the remaining intra prediction mode.

The decoding apparatus constructs the MPM list (S1010). The MPM list is composed of the same MPM list constructed in the encoding apparatus. That is, the MPM list may also include the intra prediction mode of the neighboring block, and further include the specific intra prediction modes according to a predetermined method as well. A specific method for constructing the MPM list will be described later.

Although it is illustrated that S1010 is performed later than S1000, it is illustrative, and S910 may also be performed earlier than S1000 and S1000 and S1010 may also be simultaneously performed.

The decoding apparatus determines the intra prediction mode of the current block based on the MPM list and the intra prediction mode information (S1020).

As an example, if the value of the mpm flag is 1, the decoding apparatus may derive the planar mode as the intra prediction mode of the current block or derive the candidate indicated by the mpm index among the MPM candidates in the MPM list (based on the not planar flag) as the intra prediction mode of the current block. Here, the MPM candidates may also indicate only the candidates included in the MPM list, or also include the planar mode which is applicable to a case where the value of the mpm flag is 1 as well as to the candidates included in the MPM list.

As another example, if the value of the mpm flag is 0, the decoding apparatus may derive the intra prediction mode indicated by the remaining intra prediction mode information among the remaining intra prediction modes, which are not included in the MPM list and the planar mode, as the intra prediction mode of the current block.

As still another example, if the intra prediction type of the current block is the specific type (e.g., LIP, MRL, or ISP), the decoding apparatus may also derive the planar mode or the candidate indicated by the mpm index in the MPM list as the intra prediction mode of the current block even without the confirmation of the mpm flag.

In constructing an MPM list, in an embodiment, the encoding apparatus/decoding apparatus may derive a left mode that is a candidate intra prediction mode for a left neighboring block of the current block, and may derive a top mode that is a candidate intra prediction mode for a top neighboring block of the current block. Here, the left neighboring block may represent a neighboring block located at the bottommost among left neighboring blocks located adjacent to the left of the current block, and the top neighboring block may represent a neighboring block located at the rightmost among top neighboring blocks located adjacent to the top of the current block. For example, if the size of the current block is W×H, and the x component and y component of the top-left sample position of the current block are xN and yN, respectively, the left neighboring block may be a block including a sample in coordinates (xN−1, yN+H−1), and the top neighboring block may be a block including a sample in coordinates (xN+W−1, yN−1).

For example, when the left neighboring block is available and intra prediction is applied to the left neighboring block, the encoding apparatus/decoding apparatus may derive the intra prediction mode of the left neighboring block as a left candidate intra prediction mode (i.e., left mode). When the top neighboring block is available, intra prediction is applied to the top neighboring block and the top neighboring block is included in the current CTU, the decoding apparatus may derive the intra prediction mode of the top neighboring block as a top candidate intra prediction mode (i.e., top mode). Alternatively, when the left neighboring block is not available or intra prediction is not applied to the left neighboring block, the encoding apparatus/decoding apparatus may derive a planar mode as the left mode. When the top neighboring block is not available or intra prediction is not applied to the top neighboring block or the top neighboring block is not included in the current CTU, the decoding apparatus may derive the planar mode as the top mode.

The encoding apparatus/decoding apparatus may construct the MPM list by deriving candidate intra prediction modes for the current block based on the left mode derived from the left neighboring block and the top mode derived from the top neighboring block. In this case, the MPM list may include the left mode and the top mode, and may further include specific intra prediction modes in accordance with a predetermined method.

Further, in constructing the MPM list, a normal intra prediction mode (normal intra prediction type) may be applied, or a specific intra prediction type (e.g., MRL or ISP) may be applied. This document proposes a method for constructing an MPM list when not only the normal intra prediction method (normal intra prediction type) but also the specific intra prediction type (e.g., MRL or ISP) is applied, and this will be described later.

Meanwhile, an intra prediction mode used for the MIP may indicate a matrix and an offset used for intra prediction, rather than an existing directional mode. That is, a matrix and an offset for intra prediction may be derived through an intra mode for the MIP. In this case, when deriving intra modes for general intra prediction or for generating an MPM list described above, an intra prediction mode of a block predicted by the MIP may be set to a preset mode, for example, the planar mode or the DC mode. According to another example, an intra mode for MIP may be mapped to the planar mode, the DC mode, or a directional intra mode based on a block size.

Hereinafter, matrix-based intra prediction (MIP) as an intra prediction method is described.

As described above, matrix-based intra prediction (hereinafter, MIP) may be referred to as affine linear weighted intra prediction (ALWIP) or matrix-weighted intra prediction (MWIP). To predict a sample of a rectangular block having a width (W) and a height (H), the MIP uses one H line among reconstructed samples neighboring the left boundary of the block and one W line among reconstructed samples neighboring the top boundary of the block as input values. When no reconstructed sample is available, reference samples may be generated by an interpolation method applied to general intra prediction.

Figure 11:
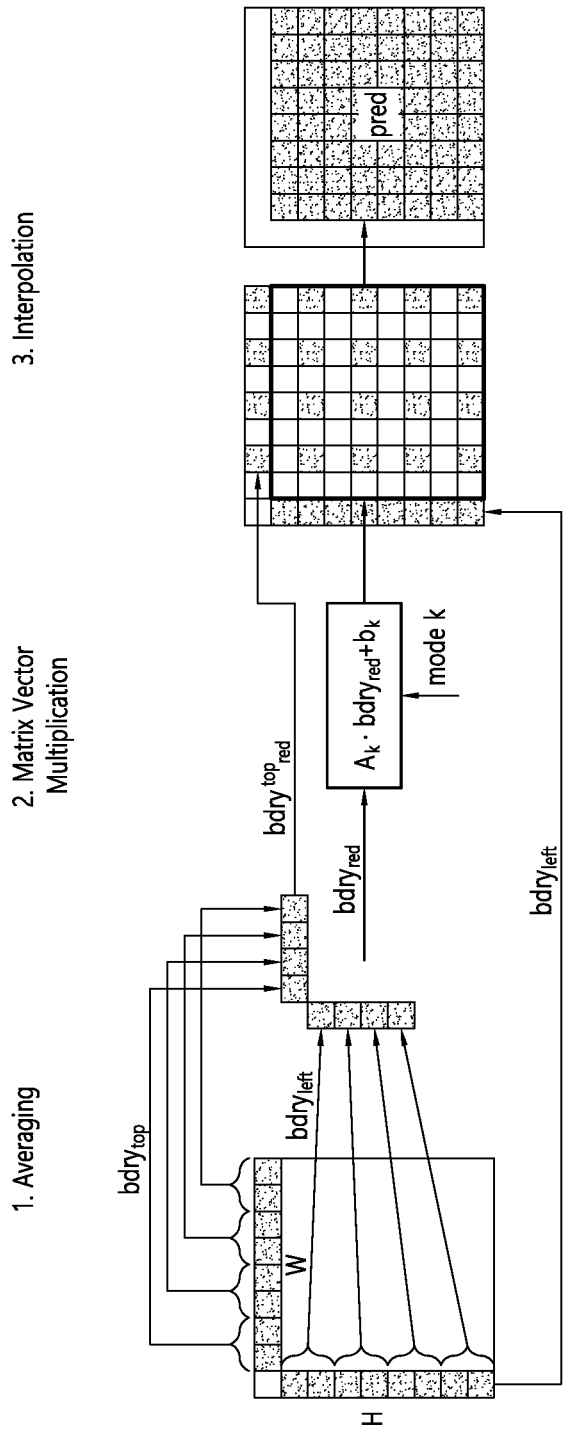
FIG. 11 illustrates an MIP-based prediction sample generation process according to an example.

FIG. 11 illustrates an MIP-based prediction sample generation process according to an example. The MIP process is described as follows with reference to FIG. 11.

1. Averaging Process

Among boundary samples, four samples for a case of W=H=4 and eight samples for any other case are extracted by an averaging process.

2. Matrix-Vector Multiplication Process

Matrix vector multiplication is performed with the averaged samples as inputs, followed by adding an offset. Through this operation, reduced prediction samples for a subsampled sample set in an original block may be derived.

3. (Linear) Interpolation Process

Prediction samples at the remaining positions are generated from the prediction samples of the subsampled sample set by linear interpolation, which is single-step linear interpolation in each direction.

A matrix and an offset vector necessary to generate a prediction block or a prediction sample may be selected from three sets $S_0$, $S_1$, and $S_2$ for a matrix.

Set $S_0$ may include 16 matrices $A_0^i$, $i \in \{0, \ldots, 15\}$, and each matrix may include 16 rows, four columns, and 16 offset vectors $b_0^i$, $i \in \{0, \ldots, 15\}$. The matrices and the offset vectors of set $S_0$ may be used for a 4×4 block. In another example, set $S_0$ may include 18 matrices.

Set $S_1$ may include eight matrices $A_1^i$, $i \in \{0, \ldots, 7\}$, and each matrix may include 16 rows, eight columns, and eight offset vectors $b_1^i$, $i \in \{0, \ldots, 7\}$. In another example, set $S_1$ may include six matrices. The matrices and the offset vectors of set $S_1$ may be used for 4×8, 8×4, and 8×8 blocks. Alternatively, the matrices and the offset vectors of set $S_1$ may be used for a 4×H or W×4 block.

Finally, set $S_2$ may include six matrices $A_2^i$, $i \in \{0, \ldots, 5\}$, and each matrix may include 64 rows, eight columns, and six offset vectors $b_2^i$, $i \in \{0, \ldots, 5\}$. The matrices and the offset vectors of set $S_2$ or some thereof may be used for any block having a different size to which set $S_0$ and set $S_1$ are not applied. For example, the matrices and the offset vectors of set $S_2$ may be used for an operation of a block having a weight and width of 8 or greater.

The total number of multiplications required the calculation of matrix-vector product is always less than or equal to 4×W×H. That is, in an MIP mode, up to four multiplications per sample is required.

Hereinafter, an overall MIP process is briefly described. Remaining blocks not described below may be processed in any one of the four cases described.

Figure 12:
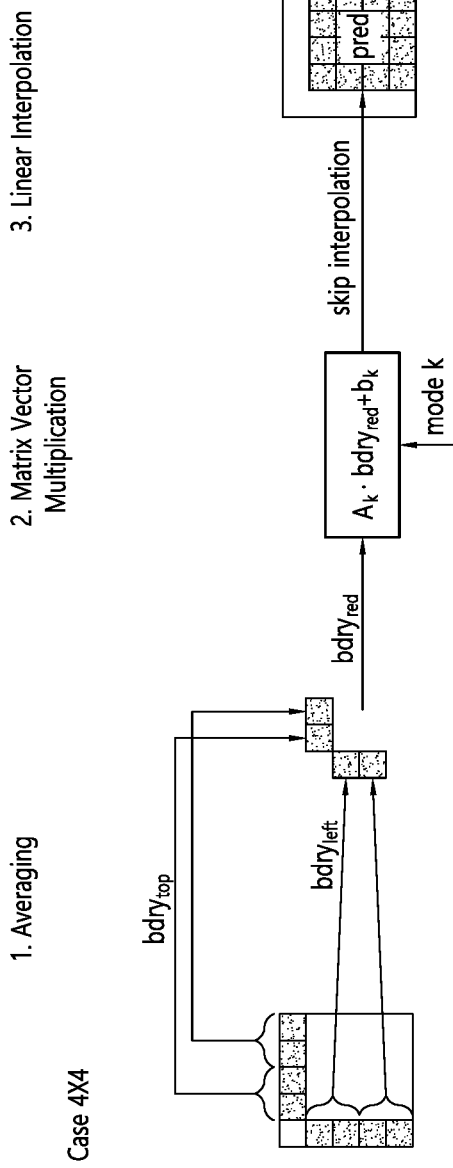
FIG. 12 illustrates an MIP process for a 4×4 block.
Figure 13:
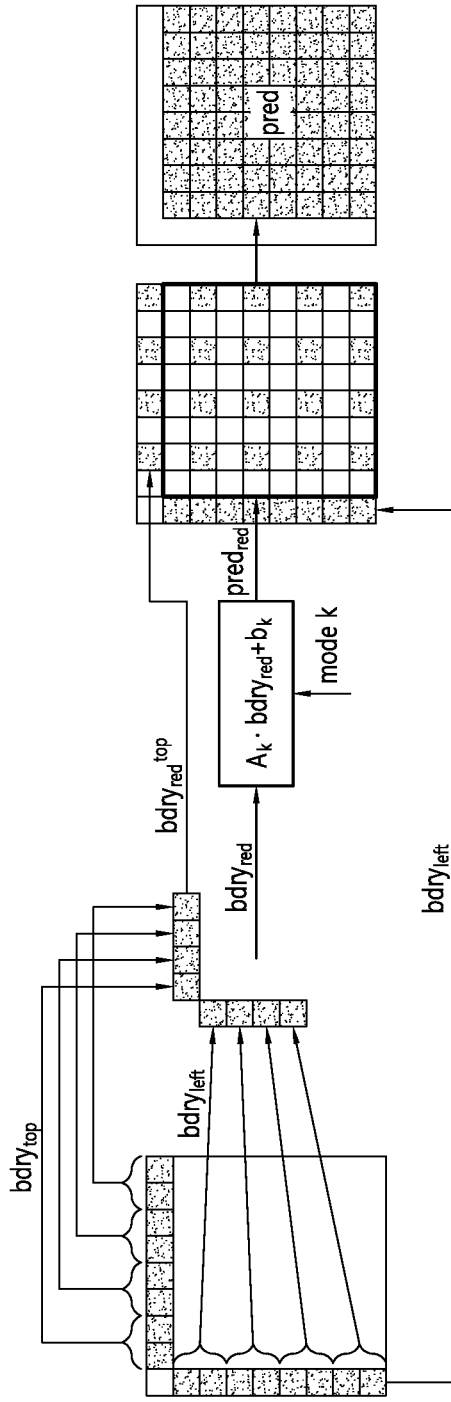
FIG. 13 illustrates an MIP process for an 8×8 block.
Figure 14:
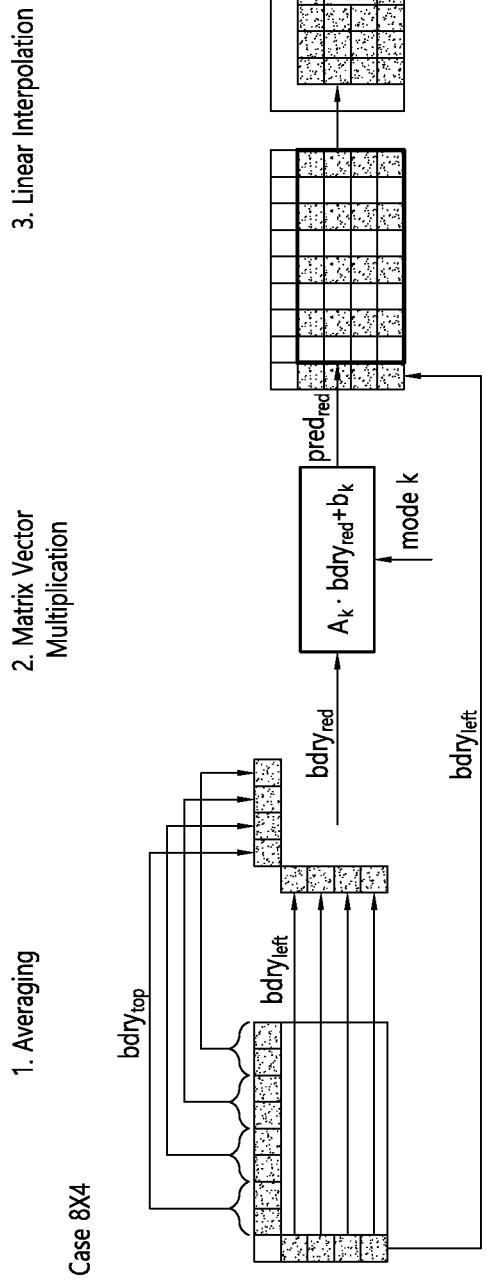
FIG. 14 illustrates an MIP process for an 8×4 block.
Figure 15:
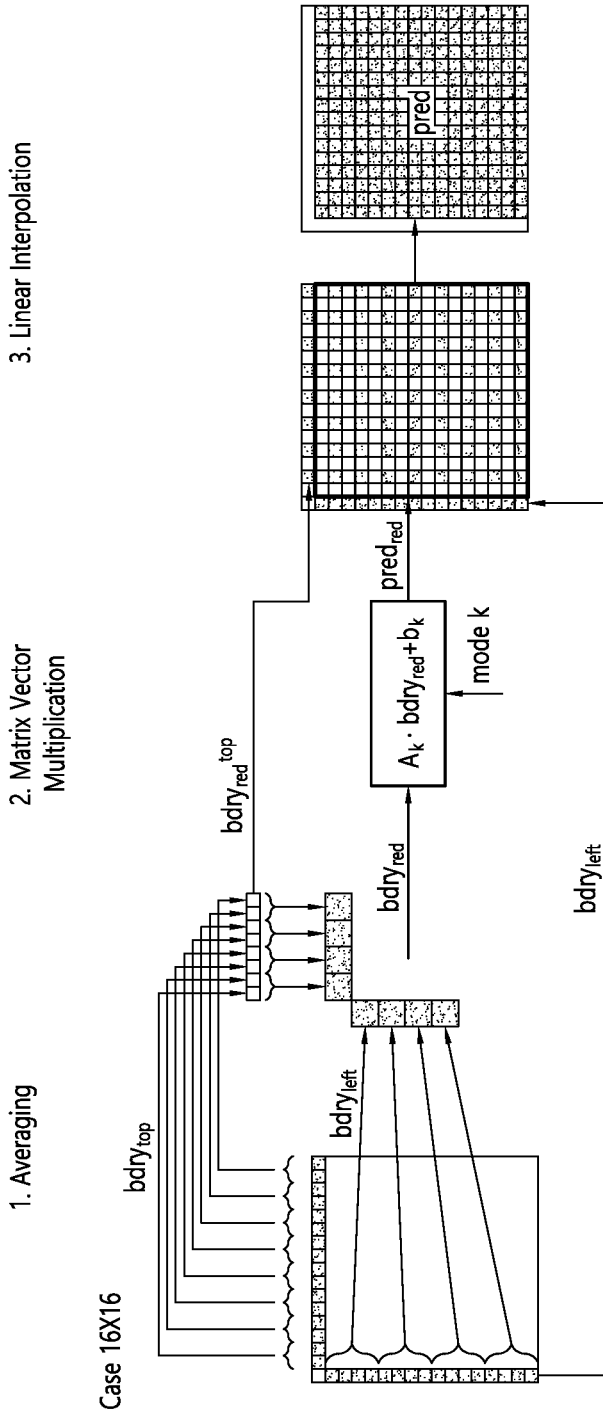
FIG. 15 illustrates an MIP process for a 16×16 block.

FIG. 12 to FIG. 15 illustrate MIP processes according to the size of a block, wherein FIG. 12 illustrates an MIP process for a 4×4 block, FIG. 13 illustrates an MIP process for an 8×8 block, FIG. 14 illustrates an MIP process for an 8×4 block, and FIG. 15 illustrates an MIP process for a 16×16 block.

As illustrated in FIG. 12, given a 4×4 block, MIP averages two samples according to each axis of a boundary. As a result, four input samples are inputs of matrix-vector multiplication, and a matrix is taken from set $S_0$. An offset is added, thereby generating 16 final prediction samples. For the 4×4 block, no linear interpolation is required to generate the prediction samples. Thus, a total of (4×16)/(4×4)=4 multiplications per sample may be performed.

As illustrated in FIG. 13, given an 8×8 block, MIP averages four samples according to each axis of a boundary. As a result, eight input samples are inputs of matrix-vector multiplication, and a matrix is taken from set $S_1$. 16 samples are generated at odd positions by the matrix-vector multiplication.

For the 8×8 block, a total of (8×16)/(8×8)=2 multiplications per sample are performed to generate prediction samples. After adding an offset, the samples are vertically interpolated using reduced top boundary samples, and horizontally interpolated using original left boundary samples. In this case, since a multiplication operation is not required in the interpolation process, a total of two multiplications per sample are required for MIP.

As illustrated in FIG. 14, given an 8×4 block, MIP averages four samples according to a horizontal axis of a boundary and uses four sample values on a left boundary according to a vertical axis. As a result, eight input samples are inputs of matrix-vector multiplication, and a matrix is taken from set $S_1$. By the matrix vector multiplication, 16 samples are generated at odd horizontal positions, and corresponding vertical positions.

For an 8×4 block, a total of (8×16)/(8×4)=4 multiplications per sample are performed to generate prediction samples. After adding an offset, the samples are horizontally interpolated using original left boundary samples. In this case, since a multiplication operation is not required in the interpolation process, a total of four multiplications per sample are required for MIP.

As illustrated in FIG. 15, given a 16×16 block, MIP averages four samples according to each axis. As a result, eight input samples are inputs of matrix-vector multiplication, and a matrix is taken from set $S_2$. By the matrix-vector multiplication, 64 samples are generated at odd positions. For a 16×16 block, a total of (8×64)/(16×16)=2 multiplications per sample are performed to generate prediction samples. After adding an offset, the samples are vertically interpolated using eight reduced top boundary samples, and are horizontally interpolated using an original left boundary sample. In this case, since a multiplication operation is not required in the interpolation process, a total of two multiplication operations per sample are required for MIP.

For a larger block, an MIP process is essentially the same as the processes described above, and it may be easily identified that the number of multiplications per sample is less than 4.

For a W×8 block with a width greater than 8 (W>8), since samples are generated at odd horizontal positions and each vertical position, only horizontal interpolation is required. In this case, (8×64)/(W×8)=64/W multiplications per sample are performed for prediction operation of reduced samples. In a case of W=16, no additional multiplication is required for linear interpolation, and in a case of W>16, the number of additional multiplications per sample required for linear interpolation is less than 2. That is, the total number of multiplications per sample is less than or equal to 4.

For a W×4 block with a width greater than 4 (W>4), a matrix resulting from omitting all rows corresponding to odd entries along the horizontal axis of a downsampled block is defined as $A_k$. Therefore, the size of output is 32, and only horizontal interpolation is performed. For prediction operation of reduced samples, (8×32)/(W×4)=64/W multiplications per sample are performed. In a case of W=16, no additional multiplication is required, and in a case of W>16, the number of additional multiplications per sample required for linear interpolation is less than 2. That is, the total number of multiplications per sample is less than or equal to 4.

When a matrix is transposed, processing may be performed accordingly.

Figure 16:
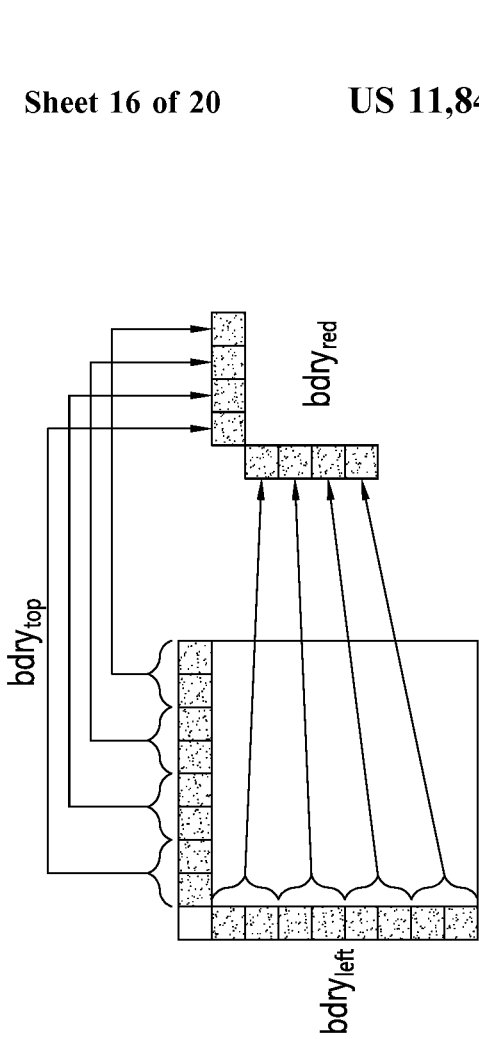
FIG. 16 illustrates a boundary averaging process in an MIP process.

FIG. 16 illustrates a boundary averaging process in an MIP process. The averaging process is described in detail with reference to FIG. 16.

According to the averaging process, averaging is applied to each boundary, either a left boundary or a top boundary. A boundary indicates a neighboring reference sample adjacent to the boundary of a current block as shown in FIG. 16. For example, the left boundary ($bdry^{left}$) indicates a left neighboring reference sample adjacent to the left boundary of the current block, and the top boundary (bdry$^{top}$) indicates a top neighboring reference sample adjacent to the top.

When the current block is a 4×4 block, the size of each boundary may be reduced to two samples through the averaging process. When the current block is not a 4×4 block, the size of each boundary may be reduced to four samples through the averaging process.

A first step of the averaging process is reducing an input boundary (bdry$^{left}$ and bdry$^{top}$) to a smaller boundary (bdry$_{red}^{top}$ and bdryl$_{red}^{left}$). bdry$_{red}^{top}$ and bdryl$_{red}^{left}$ include two samples for a 4×4 block, and includes four samples for any other case.

For the 4×4 block, in 0≤i<2, bdry$_{red}^{top}$ may be represented by the following equation, and bdryl$_{red}^{left}$ may be similarly defined.

$$bdry_{red}^{top}[i] = \left(\left(\sum_{j=0}^{1} bdry^{top}[i \cdot 2 + j]\right) + 1\right) \gg 1 \qquad \text{[Equation 1]}$$

When the width of the block is W=4×2$^k$ in 0≤i<4, bdry$_{red}^{top}$ may be represented by the following equation, and bdry$_{red}^{left}$ may be similarly defined.

$$bdry_{red}^{top}[i] = \left(\left(\sum_{j=0}^{2^k-1} bdry^{top}[i \cdot 2^k + j]\right) + (1 \ll (k-1))\right) \gg k \qquad \text{[Equation 2]}$$

Since the two reduced boundaries bdry$_{red}^{top}$ and bdryl$_{red}^{left}$ are concatenated to a reduced boundary vector bdry$_{red}$, bdry$_{red}$ has a size of 4 in the 4×4 block and has a size of 8 in any other block.

When "mode" indicates an MIP mode, the reduced boundary vector bdry$_{red}$ and the range of the MIP mode may be defined based on the size of the block and an intra_mip_transposed_flag value according to the following equation.

$$bdry_{red} = \begin{cases} [bdry_{red}^{top}, bdry_{red}^{left}] & 0 \le \text{mode} \le 15 \text{ for } W = H = 4, \text{intra\_mip\_transposed\_flag} = 0 \\ [bdry_{red}^{left}, bdry_{red}^{top}] & 0 \le \text{mode} \le 15 \text{ for } W = H = 4, \text{intra\_mip\_transposed\_flag} = 1 \\ [bdry_{red}^{top}, bdry_{red}^{left}] & 0 \le \text{mode} \le 7 \text{ for } \max(W, H) = 8, \text{intra\_mip\_transposed\_flag} = 0 \\ [bdry_{red}^{left}, bdry_{red}^{top}] & 0 \le \text{mode} \le 7 \text{ for } \max(W, H) = 8, \text{intra\_mip\_transposed\_flag} = 1 \\ [bdry_{red}^{top}, bdry_{red}^{left}] & 0 \le \text{mode} \le 5 \text{ for } \max(W, H) > 8, \text{intra\_mip\_transposed\_flag} = 0 \\ [bdry_{red}^{left}, bdry_{red}^{top}] & 0 \le \text{mode} \le 5 \text{ for } \max(W, H) > 8, \text{intra\_mip\_transposed\_flag} = 1 \end{cases} \qquad \text{[Equation 3]}$$

In the above equation, intra_mip_transposed_flag may be referred to as MIP Transpose, and this flag information may indicate whether reduced prediction samples are transposed. Semantics of this syntax element may be represented as "intra_mip_transposed_flag[x0][y0] specifies whether the input vector for matrix-based intra prediction mode for luma samples is transposed or not."

Finally, for interpolation of subsampled prediction samples, a second version of an averaged boundary is required for large blocks. That is, if a smaller value of the width and the height is greater than 8 (min(W,H)>8) and the width is equal to or greater than the height (W≥H), W=8*2$^l$ and bdry$_{redII}^{top}$ may be defined in 0≤i<8 by the following equation. If the smaller value of the width and the height is greater than 8 (min (W,H)>8) and the height is greater than the width (H>W), bdry$_{redII}^{left}$ may be similarly defined.

$$bdry_{redII}^{top}[i] = \left(\left(\sum_{j=0}^{2^l-1} bdry^{top}[i \cdot 2^l + j]\right) + (1 \ll (l-1))\right) \gg l \qquad \text{[Equation 4]}$$

Next, a process for generating reduced prediction samples by matrix-vector multiplication is described.

One of reduced input vectors bdry$_{red}$ generates a reduced prediction sample pred$_{red}$. The prediction sample is a signal for a downsampled block with a width of W$_{red}$ and a height of H$_{red}$. Here, W$_{red}$ and H$_{red}$ are defined as follows.

$$W_{red} = \begin{cases} 4 & \text{for } \max(W, H) \le 8 \\ \min(W, 8) & \text{for } \max(W, H) > 8 \end{cases} \qquad \text{[Equation 5]}$$

$$H_{red} = \begin{cases} 4 & \text{for } \max(W, H) \le 8 \\ \min(H, 8) & \text{for } \max(W, H) > 8 \end{cases}$$

The reduced prediction sample pred$_{red}$ may be obtained by performing matrix-vector multiplication and then adding an offset and may be derived by the following equation.

$$\text{pred}_{red} = A \cdot \text{bdry}_{red} + b \qquad \text{[Equation 6]}$$

Here, A is a matrix including W$_{red}$×h$_{red}$ rows and four columns where W and H are 4 (W=H=4) or eight columns in any other case, and b is a W$_{red}$×h$_{red}$ vector.

The matrix A and the vector b may be selected from S$_0$, S$_1$, and S$_2$ as below, and index idx=idx(W,H) may be defined by Equation 7 or Equation 8.

$$idx(W, H) = \begin{cases} 0 & \text{for } W = H = 4 \\ 1 & \text{for } \max(W, H) = 8 \\ 2 & \text{for } \max(W, H) > 8 \end{cases} \qquad \text{[Equation 7]}$$

$$idx(W, H) = \begin{cases} 0 & \text{for } W = H = 4 \\ 1 & \text{for } W \text{ or } H = 4, \text{ or } W = H = 8 \\ 2 & \text{for } \max(W, H) > 8 \end{cases} \qquad \text{[Equation 8]}$$

When idx is 1 or less (idx≤1) or when idx is 2 and a smaller value of W and H is greater than 4 (min(W,H)>4), A is set to A$_{idx}^m$ (A=A$_{idx}^m$) and b is set to b$_{idx}^m$ (b=b$_{idx}^m$). When idx is 2, the smaller value of W and H is 4 (min(W, H)=4), and W is 4, A is a matrix arising by removing each row of A$_{idx}^m$ corresponding to an odd x coordinate in the downsampled block. Alternatively, when H is 4, A is a matrix arising by removing each column of A$_{idx}^m$ corresponding to an odd y coordinate in the downsampled block.

Finally, the reduced prediction sample may be replaced by the transpose thereof in Equation 9.

W=H=4 and intra_mip_transposed_flag=1 max(W,H)=8 and intra_mip_transposed_flag=1 max(W,H)>8 and intra_mip_transposed_flag=1   [Equation 9]

When W=H=4, since A includes four columns and 16 rows, the number of multiplications needed to calculate $pred_{red}$ is 4. In any other case, since A includes eight columns and $W_{red} \times h_{red}$ rows, up to four multiplications per sample are needed to calculate $pred_{red}$.

Figure 17:
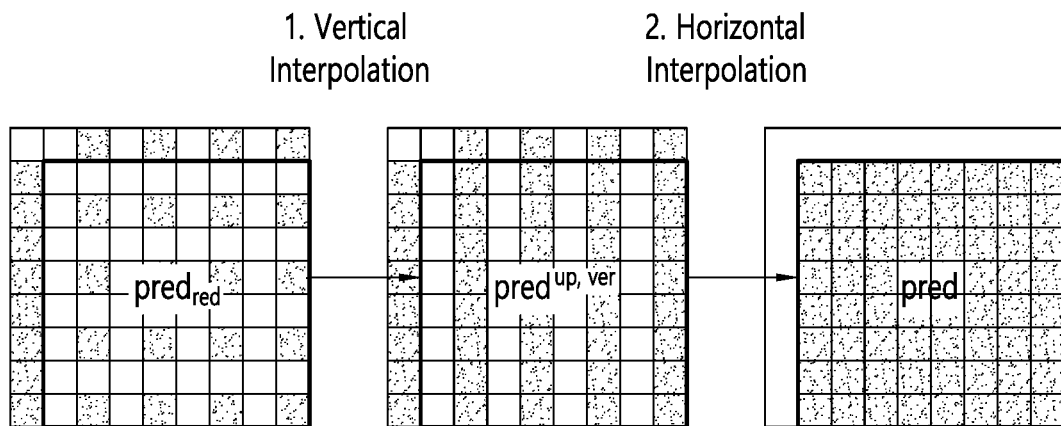
FIG. 17 illustrates linear interpolation in an MIP process.

FIG. 17 illustrates linear interpolation in the MIP process. A linear interpolation process is described as follows with reference to FIG. 17.

An interpolation process may be referred to as a linear interpolation process or a bilinear interpolation process. The interpolation process may include two steps, which are 1) vertical interpolation and 2) horizontal interpolation, as illustrated.

If W>=H, vertical linear interpolation may be applied first, followed by horizontal linear interpolation. If W<H, horizontal linear interpolation may be applied first, followed by vertical linear interpolation. In a 4×4 block, the interpolation process may be omitted.

In a W×H block where max(W,H)≥8, a prediction sample is derived from a reduced prediction sample $pred_{red}$ in $W_{red} \times H_{red}$. Depending on a block type, linear interpolation is performed vertically, horizontally, or in both directions. When linear interpolation is applied in both directions, if W<H, linear interpolation is applied first in a horizontal direction, and otherwise, linear interpolation is applied first in a vertical direction.

For a W×H block where max(W,H)≥8 and W>=H, it may be considered that there is no generality loss. In this case, one-dimensional linear interpolation is performed as follows. When there is no generality loss, linear interpolation in the vertical direction is sufficiently explained.

First, the reduced prediction sample is expanded upwards by a boundary signal. When a vertical upsampling coefficient $U_{ver}=H/H_{red}$ is defined and $U_{ver}=2^{u_{ver}}>1$ is set, the expanded reduced prediction sample may be set by the following equation.

$$pred_{red}[x][-1] = \begin{cases} bdry_{red}^{top}[x] & \text{for } W = 8 \\ bdry_{redII}^{top}[x] & \text{for } W > 8 \end{cases} \quad \text{[Equation 10]}$$

Subsequently, a vertical linear interpolation prediction sample may be generated from the expanded reduced prediction sample by the following equation.

$$pred_{red}^{ups,ver}[x][U_{ver} \cdot y + k] = \quad \text{[Equation 11]}$$
$$\left((U_{ver} - k - 1) \cdot pred_{red}[x][y-1] + \right.$$
$$\left. (k+1) \cdot pred_{red}[x][y] + \frac{U_{ver}}{2}\right) \gg u_{ver}$$

Here, x may be $0 \le x < W_{red}$, y may be $0 \le y < H_{red}$, and k may be $0 \le k < U_{ver}$.

Hereinafter, a method for maximizing performance of an MIP technique while reducing complexity thereof is described. Embodiments to be described below may be performed independently or in combination.

Meanwhile, when the MIP is applied to the current block, an MPM list for the current block to which the MIP is applied may be configured separately. The MPM list may be called various names such as MIP MPM list (or LWIP MPM list, candLwipModeList) in order to distinguish it from the MPM list when ALWIP is not applied to the current block. Hereinafter, it is expressed as the MIP MPM list for specifying, but it may be referred to as an MPM list.

The MIP MPM list may include n candidates, for example, n may be 3. The MIP MPM list may be configured based on a left neighboring block and a top neighboring block of the current block. Here, the left neighboring block may indicate a block located at an uppermost position among neighboring blocks adjacent to the left boundary of the current block. Also, the top neighboring block may indicate a block located at the leftmost position among neighboring blocks adjacent to the upper boundary of the current block.

For example, when the MIP is applied to the left neighboring block, the first candidate intra prediction mode (or candLwipModeA) may be set to be the same as the MIP mode of the left neighboring block. Also, for example, when the MIP is applied to the top neighboring block, the second candidate intra prediction mode (or candLwipModeB) may be set to be the same as the MIP mode prediction mode of the top neighboring block.

Meanwhile, the left neighboring block or the top neighboring block may be coded based on intra prediction rather than the MIP. That is, when coding the left neighboring block or the top neighboring block, an intra prediction type other than the MIP may be applied. In this case, it is not suitable to use the general intra prediction mode number of the neighboring block to which MIP is not applied (left neighboring block/top neighboring block) as a candidate intra mode for the current block to which the MIP is applied. Therefore, in this case, as an example, the MIP mode of the neighboring block to which MIP is not applied (left neighboring block/top neighboring block) may be regarded as the MIP mode prediction mode of a specific value (eg, 0, 1 or 2, etc.). Alternatively, as another example, a general intra prediction mode of the neighboring block to which MIP is not applied (left neighboring block/upper neighboring block) may be mapped to the MIP mode based on a predetermined mapping table and used to configure the MIP MPM list. In this case, the mapping may be performed based on the block size type of the current block.

In addition, even if the neighboring block (eg, left neighboring block/top neighboring block) is not available (eg, located outside the current picture, located outside the current tile/tile group, etc.) or even if the MIP is applied, a MIP mode that is not available for the current block may be used according to the block size type. In this case, a specific MIP mode predefined for the first candidate and/or the second candidate may be used as the first candidate intra prediction mode or the second candidate intra prediction mode. In addition, a specific MIP prediction mode predefined for the third candidate may be used as the third candidate intra prediction mode.

In an existing MIP mode, like an existing intra prediction mode derivation method, an MPM flag is separately transmitted with respect to a non-MPM and an MPM, and an MIP mode for a current block is coded based on the MPM or the non-MPM.

According to an embodiment, for a block to which the MIP technique is applied, a structure for directly coding the MIP mode without separating the MPM and the non-MPM may be proposed. This image coding structure makes it possible to simplify a complex syntax structure. Further, since the frequencies of individual modes actually occurring in the MIP mode are relatively uniformly distributed and are thus significantly different from the frequencies thereof in the existing intra mode, the proposed coding structure makes it possible to maximize efficiency in encoding and decoding MIP mode information.

Image information transmitted and received for MIP according to the embodiment is as follows. The following syntax may be included in video/image information transmitted from the foregoing encoding apparatus to the decoding apparatus, and may be configured/encoded in the encoding apparatus to be signaled in the form of a bitstream to the decoding apparatus, and the decoding apparatus may parse/decode the information (syntax elements) included according to a condition/order disclosed in the syntax.

TABLE 1

7.3.6.5 Coding unit syntax

```
if( sps_mip_enabled_flag &&
    ( Abs( Log2( cbWidth ) − Log2( cbHeight ) ) <= 2 ) &&
        cbWidth <= MaxTbSizeY && cbHeight <=
        MaxTbSizeY )
    intra_mip_flag[ x0 ][ y0 ]                               ae(v)
if( intra_mip_flag[ x0 ][ y0 ] )
    intra_mip_mode_idx[ x0 ][ y0 ]                           ae(v)
``` intra_mip_flag[ x0 ][ y0 ] equal to 1 specifies that the intra prediction type for luma samples is matrix-based intra prediction. intra_mip_flag[ x0 ][ y0 ] equal to 0 specifies that the intra prediction type for luma samples is not matrix-based intra prediction. When intra_mip_flag[ x0 ][ y0 ] is not present, it is inferred to be equal to 0.
intra_mip_mode_idx[ x0 ][ y0 ] specifies the matrix-based intra prediction mode for luma samples. The array indices x0, y0 specify the location (x0, y0) of the top-left luma sample of the considered coding block relative to the top-left luma sample of the picture.

As illustrated in Table 1, syntax intra_mip_flag and intra_mip_mode_idx for the MIP mode for the current block may be included and signaled in syntax information on a coding unit.

Meanwhile, sps_mip_enabled_flag, which is flag information indicating whether matrix-based intra prediction (MIP) is applicable to the current block, may be further received, and intra_mip_flag may be signaled based on the flag information.

The flag information sps_mip_enabled_flag may be signaled through sequence parameter set (SPS) syntax information.

The value of intra_mip_flag equal to 1 indicates that an intra prediction type for a luma sample is matrix-based intra prediction, and the value equal to 0 indicates that the intra prediction type for the luma sample is not matrix-based intra prediction.

intra_mip_mode_idx equal to 1 indicates a matrix-based intra prediction mode for the luma sample. This matrix-based intra prediction mode may indicate a matrix and an offset or a matrix for MIP as described above.

Further, according to an example, flag information indicating whether an input vector for matrix-based intra prediction is transposed, for example, intra_mip_transposed_flag, may be further signaled through syntax of the coding unit. intra_mip_transposed_flag equal to 1 indicates that the input vector is transposed, and the number of matrices for matrix-based intra prediction may be reduced by this flag information.

intra_mip_mode_idx may be encoded and decoded by a truncated binarization method as illustrated in the following table.

TABLE 2

| Syntax structure | Syntax element | Binarization | |
|---|---|---|---|
| | | Process | Input parameters |
| | intra_mip_flag[ ][ ] | FL | cMax = 1 |
| | intra_mip_mode_idx[ ][ ] | TB | cMax = (cbWidth = = 4 && cbHeight = = 4) ? 34 : ( (cbWidth <= 8 && cbHeight <= 8) ? 18 : 10) |

| | binIdx | | | | | |
|---|---|---|---|---|---|---|
| Syntax element | 0 | 1 | 2 | 3 | 4 | >=5 |
| intra_mip_mpm_flag[ ][ ] | 0 | na | na | na | na | na |
| intra_mip_mode_idx[ ][ ] | bypass | bypass | bypass | bypass | bypass | bypass |

As illustrated in Table 2, intra_mip_flag is binarized with a fixed-length code, while intra_mip_mode_idx is binarized with the truncated binarization method, and a maximum binarization length (cMax) may be set according to the size of the coding block. If the width and height of the coding block is 4 (cbWidth==4 && cbHeight==4), the maximum binarization length may be set to 34, and otherwise, the maximum binarization length may be set to 18 or 10 depending on whether the width and height of the coding block is 8 or less ((cbWidth<=8 && cbHeight<=8)?).

intra_mip_mode_idx may be coded by a bypass method instead of a context model-based method. By coded in the bypass method, coding speed and efficiency may be increased.

According to another example, when intra_mip_mode_idx is binarized by the truncated binarization method, the maximum binarization length may be as illustrated in the following table.

TABLE 3

| Syntax structure | | |
|---|---|---|
| | Binarization | |
| Syntax element | Process | Input parameters |
| intra_mip_flag[ ][ ] | FL | cMax = 1 |
| intra_mip_mode_idx[ ][ ] | TB | cMax = (cbWidth = = 4 && cbHeight = = 4) ? 15 : ( ( (cbWith = = 4 \| \| cbHeight = = 4) \| \| (cbWith = = 8 && cbHeight = = 8) )? 7 : 5) |

As illustrated in Table 3, if the width and height of the coding block are 4 ((cbWidth==4 && cbHeight==4)), the maximum binarization length of intra_mip_mode_idx may be set to 15; otherwise, the maximum binarization length may be set to 7 if the width or height of the coding block is 4 ((cbWith==4||cbHeight==4)) or if the width and height of the coding block are 8 (cbWith==8 && cbHeight==8), and may be set to 5 if the width or height of the coding block is 4 ((cbWith==4||cbHeight==4)) or if the width and height of the coding block are not 8 (cbWith==8 && cbHeight==8).

According to another example, intra_mip_mode_idx may be encoded with a fixed-length code. In this case, to increase encoding efficiency, the number of available MIP modes may be limited to a power of 2 for each block size (e.g., $A=2^{K1}-1$, $B=2^{K2}-1$, and $C=2^{K3}-1$, where K1, K2, and K3 are positive integers).

The above description is illustrated in the following table.

TABLE 4

| Syntax structure | | |
| --- | --- | --- |
| | | Binarization |
| Syntax element | Process | Input parameters |
| intra_mip_flag[ ][ ] | FL | cMax = 1 |
| intra_mip_mode_idx[ ][ ] | FL | cMax = (cbWidth = = 4 && cbHeight = = 4) ? A : ( (cbWidth <= 8 && cbHeight <= 8) ? B : C) |

In Table 4, when K1=5, K2=4, and K3=3, intra_mip_mode may be binarized as follows.

TABLE 5

| Syntax structure | | |
| --- | --- | --- |
| | | Binarization |
| Syntax element | Process | Input parameters |
| intra_mip_flag[ ][ ] | FL | cMax = 1 |
| intra_mip_mode[ ][ ] | FL | cMax = (cbWidth = = 4 && cbHeight = = 4) ? 31 : ( (cbWidth <= 8 && cbHeight <= 8) ? 15 : 7) |

Alternatively, according to an example, when K1 is set to 4 and thus the width and height of the coding block are 4, the maximum binarization length of intra_mip_mode of the block may be set to 15. In addition, when K2 is set to 3 and thus the width or height of the coding block is 4 or the width and height of the coding block are 8, the maximum binarization length may be set to 7.

An embodiment may propose a method of using MIP only for specific blocks to which an MIP technique can be efficiently applied. When the method according to the embodiment is applied, it is possible to reduce the number of matrix vectors required for MIP and to significantly reduce memory required to store the matrix vectors (50%). With these effects, encoding efficiency is maintained almost the same (less than 0.1%).

The following table illustrates syntax including a specific condition to which the MIP technique is applied according to the embodiment.

TABLE 6

| 7.3.6.5 Coding unit syntax |
| --- |
| if( sps_mip_enabled_flag && <br> ( ( cbWidth > K1 || cbHeight > K2 ) && |

TABLE 6-continued

| 7.3.6.5 Coding unit syntax | |
| --- | --- |
| cbWidth <= MaxTbSizeY && cbHeight <= MaxTbSizeY ) | |
| intra_mip_flag[ x0 ][ y0 ] | ae(v) |
| if( intra_mip_flag[ x0 ][ y0 ] ) | |
| intra_mip_mode_idx[ x0 ][ y0 ] | ae(v) | intra_mip_flag[ x0 ][ y0 ] equal to 1 specifies that the intra prediction type for luma samples is matrix-based intra prediction. intra_mip_flag[ x0 ][ y0 ] equal to 0 specifies that the intra prediction type for luma samples is not matrix-based intra prediction. When intra_mip_flag[ x0 ][ y0 ] is not present, it is inferred to be equal to 0.
intra_mip_mode_idx[ x0 ][ y0 ] specifies the matrix-based intra prediction mode for luma samples. The array indices x0, y0 specify the location (x0, y0) of the top-left luma sample of the considered coding block relative to the top-left luma sample of the picture.

As illustrated in Table 6, a condition of applying M only to a large block (cbWidth>K1||cbHeight(>K2) may be added, and the size of the block may be determined based on preset values (K1 and K2). The reason why MIP is applied only to a large block is that encoding efficiency of MIP appears in a relatively large block.

The following table illustrates an example in which K1 and K2 in Table 6 are predefined as 8.

TABLE 7

| 7.3.6.5 Coding unit syntax | |
| --- | --- |
| if( sps_mip_enabled_flag && <br> ( ( cbWidth > 8 || cbHeight > 8 ) && <br>     cbWidth <= MaxTbSizeY && cbHeight <= MaxTbSizeY ) | |
| intra_mip_flag[ x0 ][ y0 ] | ae(v) |
| if( intra_mip_flag[ x0 ][ y0 ] ) | |
| intra_mip_mode_idx[ x0 ][ y0 ] | ae(v) | intra_mip_flag[ x0 ][ y0 ] equal to 1 specifies that the intra prediction type for luma samples is matrix-based intra prediction. intra_mip_flag[ x0 ][ y0 ] equal to 0 specifies that the intra prediction type for luma samples is not matrix-based intra prediction. When intra_mip_flag[ x0 ][ y0 ] is not present, it is inferred to be equal to 0.
intra_mip_mode_idx[ x0 ][ y0 ] specifies the matrix-based intra prediction mode for luma samples. The array indices x0, y0 specify the location (x0, y0) of the top-left luma sample of the considered coding block relative to the top-left luma sample of the picture.

Semantics of intra_mip_flag and intra_mip_mode_idx in Table 6 and Table 7 is the same as illustrated in Table 1.

When intra_mip_mode_idx has 11 possible modes, intra_mip_mode_idx may be encoded by truncated binarization (cMax=10) as follows.

TABLE 8

| Syntax structure | Syntax element | Binarization | |
|---|---|---|---|
| | | Process | Input parameters |
| | intra_mip_flag[ ][ ] | FL | cMax = 1 |
| | intra_mip_mode_idx[ ][ ] | TB | cMax = 10 |

| | binIdx | | | | | |
|---|---|---|---|---|---|---|
| Syntax element | 0 | 1 | 2 | 3 | 4 | >=5 |
| intra_mip_mpm_flag[ ][ ] | 0 | na | na | na | na | na |
| intra_mip_mode_idx[ ][ ] | bypass | bypass | bypass | bypass | na | na |

Alternatively, when available MIP modes are limited to eight modes, intra_mip_mode_idx[x0][y0] may be encoded with a fixed-length code as follows.

TABLE 9

| Syntax structure | Syntax element | Binarization | |
|---|---|---|---|
| | | Process | Input parameters |
| | intra_mip_flag[ ][ ] | FL | cMax = 1 |
| | intra_mip_mode_idx[ ][ ] | FL | cMax = 7 |

| | binIdx | | | | | |
|---|---|---|---|---|---|---|
| Syntax element | 0 | 1 | 2 | 3 | 4 | >=5 |
| intra_mip_mpm_flag[ ][ ] | 0 | na | na | na | na | na |
| intra_mip_mode_idx[ ][ ] | bypass | bypass | bypass | na | na | na |

Both in Table 8 and in Table 9, intra_mip_mode_idx may be coded by the bypass method.

An embodiment may propose an MIP technique for applying a weighted matrix ($A_k$) and an offset vector ($b_k$) used for a large block to small blocks in order to efficiently apply the MIP technique in view of memory saving. When the method according to the embodiment is applied, it is possible to reduce the number of matrix vectors required for MIP and to significantly reduce memory required to store the matrix vectors (50%). With these effects, encoding efficiency is maintained almost the same (less than 0.1%).

FIG. 18 illustrates an MIP technique according to an embodiment of the present disclosure.

As illustrated, (a) of FIG. 18 shows an operation of a matrix and an offset vector for a large block index i, and (b) of FIG. 18 shows an operation of a sampled matrix and an offset vector operation applied to a small block.

Referring to FIG. 18, an existing MIP process may be applied by considering a subsampled weighted matrix (Sub($A_k$)) obtained by subsampling a weighted matrix used for the large block and an offset vector (Sub($b_k$)) obtained by subsampling an offset vector used for the large block respectively as a weighted matrix and an offset vector for the small block.

Here, subsampling may be applied in only one of the horizontal and vertical directions or may be applied in both directions. In particular, a subsampling factor (e.g., 1 out of 2 or 1 out of 4) and the vertical or horizontal sampling direction may be set based on the width and height of a corresponding block.

In addition, the number of intra prediction modes for MIP to which this embodiment is applied may be set differently based on the size of the current block. For example, i) when both the height and the width of the current block (coding block or transform block) are 4, 35 intra prediction modes (i.e., intra prediction modes 0 to 34) may be available, ii) when both the height and the width of the current block are 8 or less, 19 intra prediction modes (i.e., intra prediction modes 0 to 18) may be available, and iii) in other cases, 11 intra prediction modes (i.e., intra prediction modes 0 to 10) may be available.

For example, when a case where both the height and the width of the current block are 4 is defined as block size type 0, a case where both the height and the width of the current block are 8 or less is defined as block size type 1, and the other cases are defined as block size type 2, the number of intra prediction modes for MIP may be as illustrated in the following table.

TABLE 10

| block size type (sizeId) | number of MIP intra prediction modes | intra prediction mode |
|---|---|---|
| 0 | 35 | 0 . . . 34 |
| 1 | 19 | 0 . . . 18 |
| 2 | 11 | 0 . . . 10 |

To apply a weighted matrix and an offset vector used for a large block (e.g., block size type=2) to a small block (e.g., block size=0 or block size=1), the number of intra prediction modes available for each block size may be equally applied as illustrated in the following table.

TABLE 11

| block size type (sizeId) | number of MIP intra perdiction modes | intra prediction mode |
|---|---|---|
| 0 | 11 | 0 . . . 10 |
| 1 | 11 | 0 . . . 10 |
| 2 | 11 | 0 . . . 10 |

Alternatively, as illustrated below in Table 12, MIP may be applied only to block size types 1 and 2, and a weighted matrix and an offset vector defined for block size type 2 may be subsampled to be used for block size type 1. Accordingly, it is possible to efficiently save memory (50%).

TABLE 12

| block size type (sizeId) | number of MIP intra prediction modes | intra prediction mode |
|---|---|---|
| 1 | 11 | 0 . . . 10 |
| 2 | 11 | 0 . . . 10 |

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 19:
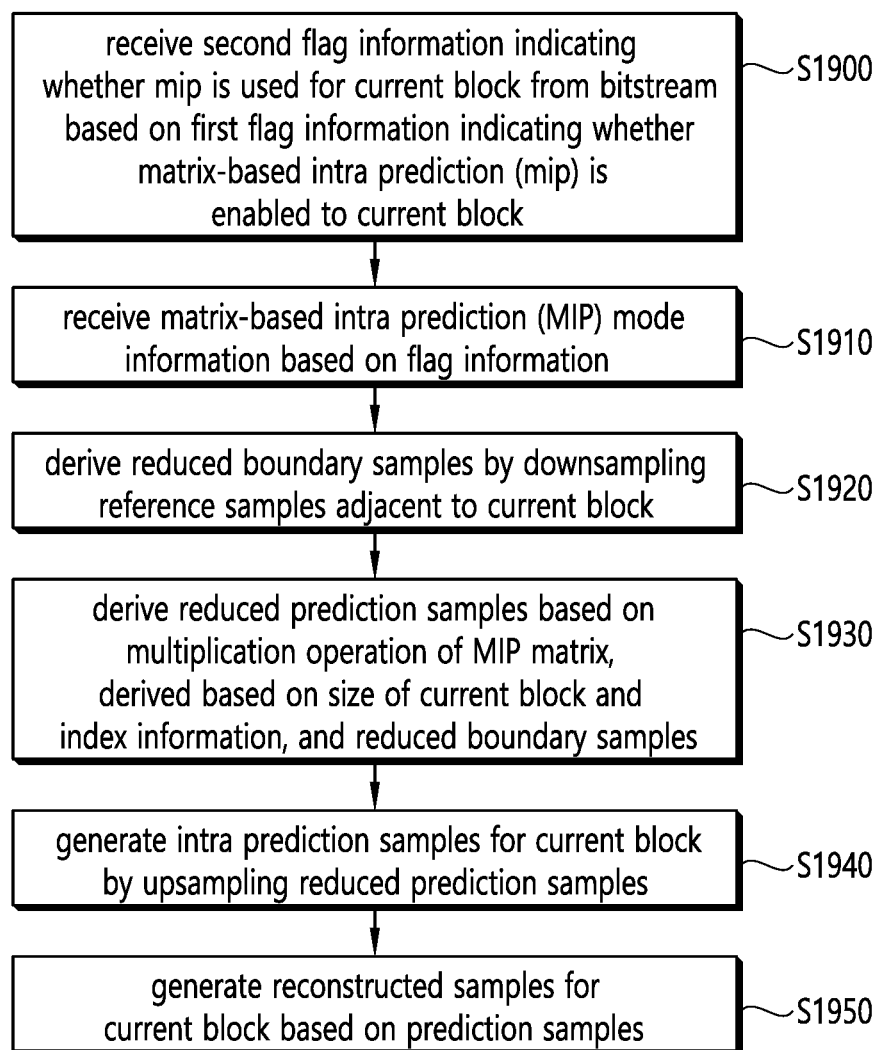
FIG. 19 is a flowchart schematically illustrating a decoding method that can be performed by a decoding apparatus according to an embodiment of the present disclosure.

FIG. 19 is a flowchart schematically illustrating a decoding method that can be performed by a decoding apparatus according to an embodiment of the present disclosure.

The method illustrated in FIG. 19 may be performed by the decoding apparatus 300 illustrated in FIG. 3. Specifically, S1900 to S1940 of FIG. 19 may be performed by the entropy decoder 310 and/or the predictor 330 (specifically, the intra predictor 331) illustrated in FIG. 3, and S1950 of FIG. 19 may be performed by the adder 340 illustrated in FIG. 3. Further, the method illustrated in FIG. 19 may be included in the foregoing embodiments of the present disclosure. Therefore, in FIG. 19, a specific description of details overlapping with the foregoing embodiments will be omitted or will be made briefly.

Referring to FIG. 19, the decoding apparatus may receive second flag information indicating whether MIP is used for the current block from the bitstream based on the first flag information indicating whether matrix-based intra prediction (MIP) is applicable to the current block (S1900).

The first flag information may be signaled through sequence parameter set (SPS) syntax information as sps_mip_enabled_flag.

If the first flag information is 1, second flag information indicating whether matrix-based intra prediction (MIP) is used for the current block may be obtained from the bitstream.

This second flag information is syntax, such as intra_mip_flag, and may be included and signaled in coding unit syntax information.

The decoding apparatus may receive matrix-based intra prediction (MIP) mode information based on the received second flag information (S1910).

The MIP mode information may be represented as intra_mip_mode_idx, and may be signaled when intra_mip_flag is equal to 1. intra_mip_mode_idx may be index information indicating an MIP mode applied to the current block, and this index information may be used to derive a matrix when generating a prediction sample.

According to an example, flag information indicating whether an input vector for matrix-based intra prediction is transposed, for example, intra_mip_transposed_flag, may be further signaled through coding unit syntax.

The decoding apparatus may generate an intra prediction sample for the current block based on the MIP information. The decoding apparatus may derive at least one neighboring reference sample from neighboring reference samples of the current block to generate the intra prediction sample and may generate prediction samples based on the neighboring reference sample.

When the MIP is applied, the decoding apparatus may derive reduced boundary samples by downsampling reference samples adjacent to the current block (S1920).

The reduced boundary samples may be derived by downsampling the reference samples using averaging.

When the width and height of the current block are 4, four reduced boundary samples may be derived, and in other cases, eight reduced boundary samples may be derived.

An averaging process for downsampling may be applied to each boundary, for example, a left boundary or a top boundary, of the current block, and may be applied to neighboring reference samples adjacent to the boundary of the current block.

According to an example, when the current block is a 4×4 block, the size of each boundary may be reduced to two samples through the averaging process, and when the current block is not a 4×4 block, the size of each boundary may be reduced to four samples through the averaging process.

Subsequently, the decoding apparatus may derive reduced prediction samples based on a multiplication operation of an MIP matrix, derived based on the size of the current block and index information, and the reduced boundary samples (S1930).

The MIP matrix may be derived based on the size of the current block and the received index information.

The MIP matrix may be selected from any one of three matrix sets classified according to the size of the current block, and each of the three matrix sets may include a plurality of MIP matrices.

That is, the three matrix sets for MIP may be set, and each matrix set may include a plurality of matrices and a plurality of offset vectors. These matrix sets may be applied separately according to the size of the current block.

For example, a matrix set including 18 or 16 matrices including 16 rows and four columns and 18 or 16 offset vectors may be applied to a 4×4 block. The index information may be information indicating any one of a plurality of matrices included in one matrix set.

A matrix set including 10 or eight matrices including 16 rows and 8 columns and 10 or eight offset vectors may be applied to 4×8, 8×4 and 8×8 blocks or a 4×H or W×4 block.

In addition, a matrix set including six matrices including 64 rows and eight columns and six offset vectors may be applied to a block other than the foregoing blocks or a block having a height and width of 8 or greater.

The reduced prediction samples, that is, prediction samples to which the MIP matrix has been applied, are derived based on an operation of adding an offset after the multiplication operation of the MIP matrix and the reduced boundary samples.

The decoding apparatus may generate intra prediction samples for the current block by upsampling the reduced prediction samples (S1940).

The intra prediction samples may be upsampled by linear interpolation of the reduced prediction samples.

An interpolation process may be referred to as a linear interpolation or bilinear interpolation process and may include two steps, which are 1) vertical interpolation and 2) horizontal interpolation.

If W>=H, vertical linear interpolation may be applied first, followed by horizontal linear interpolation. If W<H, horizontal linear interpolation may be applied first, followed by vertical linear interpolation. In a 4×4 block, the interpolation process may be omitted.

The decoding apparatus may generate reconstructed samples for the current block based on the prediction samples (S1950).

In an embodiment, the decoding apparatus may use the prediction sample directly as the reconstructed samples in accordance with the prediction mode, or may generate the reconstructed samples by adding residual samples to the prediction samples.

If residual samples for the current block exist, the decoding apparatus may receive information on the residual for the current block. The information on the residual may include transform coefficients for the residual samples. The decoding apparatus may derive the residual samples (or residual sample array) for the current block based on the residual information. The decoding apparatus may generate reconstructed samples based on the prediction samples and the residual samples, and may derive a reconstructed block or a reconstructed picture based on the reconstructed samples. Thereafter, as needed, in order to enhance the subjective/objective picture quality, the decoding apparatus can apply deblocking filtering and/or an in-loop filtering procedure, such as SAO procedure, to the reconstructed picture as described above.

Figure 20:
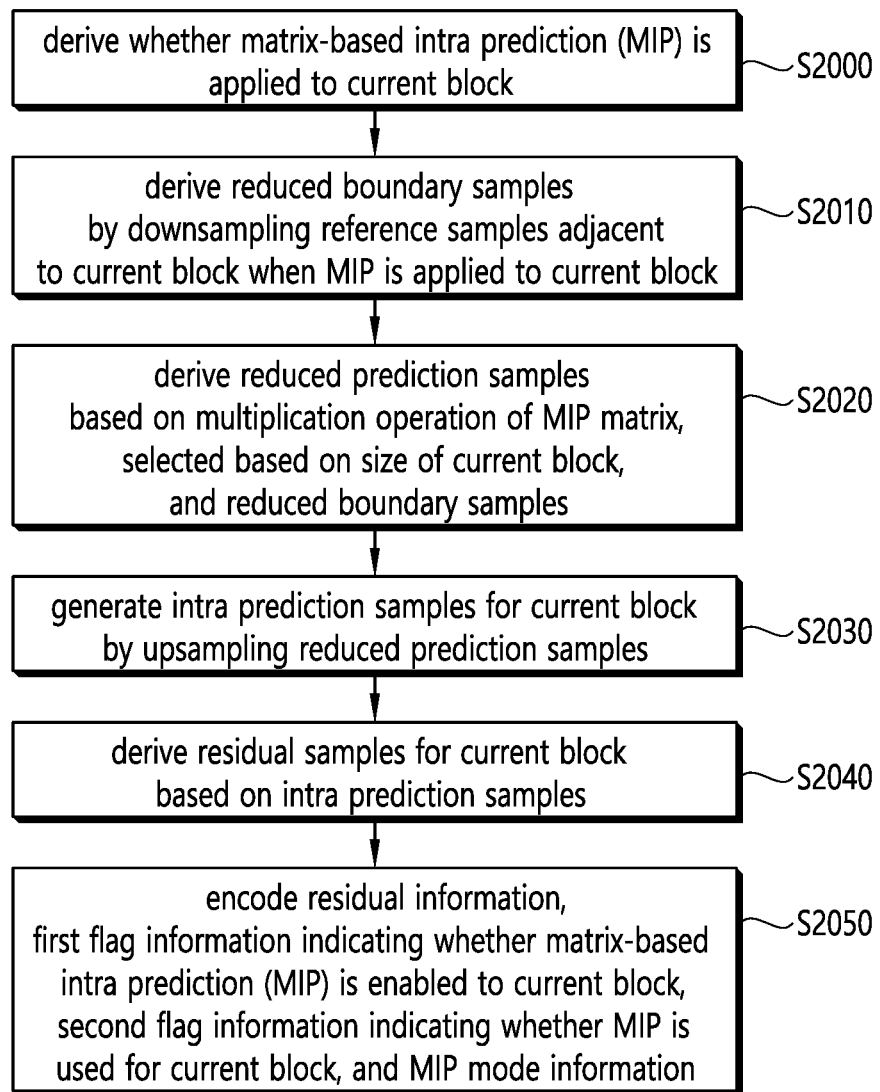
FIG. 20 is a flowchart schematically illustrating an encoding method that can be performed by an encoding apparatus according to an embodiment of the present disclosure.

FIG. 20 is a flowchart schematically illustrating an encoding method that can be performed by an encoding apparatus according to an embodiment of the present disclosure.

The method illustrated in FIG. 20 may be performed by the encoding apparatus 200 illustrated in FIG. 2. Specifically, S2000 to S2030 of FIG. 20 may be performed by the predictor 220 (specifically, the intra predictor 222) illustrated in FIG. 2, S2040 of FIG. 20 may be performed by the subtractor 231 illustrated in FIG. 2, and S2050 of FIG. 20 may be performed by the entropy encoder 240 illustrated in FIG. 2. Further, the method illustrated in FIG. 20 may be included in the foregoing embodiments of the present disclosure. Therefore, in FIG. 20, a specific description of details overlapping with the foregoing embodiments will be omitted or will be made briefly.

Referring to FIG. 20, the encoding apparatus may derive whether matrix-based intra prediction (MIP) is applied to a current block (S2000).

The encoding apparatus may apply various prediction techniques to find an optimal prediction mode for the current block and may determine an optimal intra prediction mode based on rate-distortion optimization (RDO).

When it is determined that MIP is applied to the current block, the encoding apparatus may derive reduced boundary samples by downsampling reference samples adjacent to the current block (S2010).

The reduced boundary samples may be derived by downsampling the reference samples using averaging.

When the width and height of the current block are 4, four reduced boundary samples may be derived, and in other cases, eight reduced boundary samples may be derived.

An averaging process for downsampling may be applied to each boundary, for example, a left boundary or a top boundary, of the current block, and may be applied to neighboring reference samples adjacent to the boundary of the current block.

According to an example, when the current block is a 4×4 block, the size of each boundary may be reduced to two samples through the averaging process, and when the current block is not a 4×4 block, the size of each boundary may be reduced to four samples through the averaging process.

When the reduced boundary samples are derived, the encoding apparatus may derive reduced prediction samples based on a multiplication operation of an MIP matrix, selected based on the size of the current block, and the reduced boundary samples (S2020).

The MIP matrix may be selected from any one of three matrix sets classified according to the size of the current block, and each of the three matrix sets may include a plurality of MIP matrices.

That is, the three matrix sets for MIP may be set, and each matrix set may include a plurality of matrices and a plurality of offset vectors. These matrix sets may be applied separately according to the size of the current block.

For example, a matrix set including 18 or 16 matrices including 16 rows and four columns and 18 or 16 offset vectors may be applied to a 4×4 block. Index information may be information indicating any one of a plurality of matrices included in one matrix set.

A matrix set including 10 or eight matrices including 16 rows and 8 columns and 10 or eight offset vectors may be applied to 4×8, 8×4 and 8×8 blocks or a 4×H or W×4 block.

In addition, a matrix set including six matrices including 64 rows and eight columns and six offset vectors may be applied to a block other than the foregoing blocks or a block having a height and width of 8 or greater.

The reduced prediction samples, that is, prediction samples to which the MIP matrix has been applied, may be derived based on an operation of adding an offset after the multiplication operation of the MIP matrix and the reduced boundary samples.

The encoding apparatus may generate intra prediction samples for the current block by upsampling the reduced prediction samples (S2030).

The intra prediction samples may be upsampled by linear interpolation of the reduced prediction samples.

An interpolation process may be referred to as a linear interpolation or bilinear interpolation process and may include two steps, which are 1) vertical interpolation and 2) horizontal interpolation.

If W>=H, vertical linear interpolation may be applied first, followed by horizontal linear interpolation. If W<H, horizontal linear interpolation may be applied first, followed by vertical linear interpolation. In a 4×4 block, the interpolation process may be omitted.

The encoding apparatus may derive residual samples for the current block based on the prediction samples for the current block and original samples of the current block (S2040).

In addition, the encoding apparatus may generate residual information on the current block based on the residual samples, and encode image information including the residual information, first flag information indicating whether matrix-based intra prediction (MIP) is enabled to the current block, second flag information indicating whether the MIP is used for the current block, and MIP mode information (S2050).

Here, the residual information may include value information, position information, a transform scheme, a transform kernel, and a quantization parameter relating to quantized transform coefficients derived by transforming and quantizing the residual samples.

The first flag information indicating whether matrix-based intra prediction (MIP) is enabled to the current block may be encoded through sequence parameter set (SPS) syntax information as sps_mip_enabled_flag.

The second flag information indicating whether MIP is applied is syntax, such as intra_mip_flag, and may be included and encoded in coding unit syntax information.

The MIP mode information may be represented as intra_mip_mode_idx, and may be encoded when intra_mip_flag is equal to 1. intra_mip_mode_idx may be index information indicating an MIP mode applied to the current block, and this index information may be used to derive a matrix when generating a prediction sample. The index information may indicate any one of the plurality of matrices included in one matrix set.

According to an example, flag information indicating whether an input vector for matrix-based intra prediction is transposed, for example, intra_mip_transposed_flag, may be further signaled through coding unit syntax.

That is, the encoding apparatus may encode the image information including the MIP mode information on the current block and/or the residual information and may output the image information as a bitstream.

The bisstream may be transmitted to a decoding apparatus through a network or (digital) storage medium. The network may include a broadcast network and/or a communication network, and the digital storage medium may include various storage media, such as USB, SD, CD, DVD, Blue-ray, HDD, and SSD.

The foregoing process of generating the prediction samples for the current block may be performed by the intra predictor 222 of the encoding apparatus 200 illustrated in FIG. 2, the process of deriving the residual samples may be performed by the subtractor 231 of the encoding apparatus 200 illustrated in FIG. 2, and the process of generating and encoding the residual information may be performed by the residual processor 230 and the entropy encoder 240 of the encoding apparatus 200 illustrated in FIG. 2.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (e.g., information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blu-ray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, the method comprising:
receiving residual information;
receiving second flag information related to whether matrix-based intra prediction (MIP) is used for a current block based on first flag information related to whether the MIP is enabled;
receiving MIP mode information based on the second flag information;
generating intra prediction samples for the current block based on the MIP mode information;
deriving residual samples based on the residual information; and
generating reconstructed samples for the current block based on the intra prediction samples and the residual samples,
wherein the MIP mode information is index information related to an MIP matrix for the current block,
wherein the MIP matrix is derived based on a size of the current block and the index information,
wherein the intra prediction samples is generated based on the MIP matrix,
wherein a syntax element bin string for the MIP mode information is binarized by a truncated binarization method,
wherein a maximum length of the syntax element bin string is set to different three values based on the size of the current block, and
wherein based on a width and a height of the current block being 4, the maximum length has a largest value.

2. The image decoding method of claim 1, wherein the generating of the intra prediction samples comprises:
deriving reduced boundary samples by downsampling reference samples adjacent to the current block;
deriving reduced prediction samples based on a multiplication operation of the reduced boundary samples and the MIP matrix; and
generating the intra prediction samples for the current block by upsampling the reduced prediction samples.

3. The image decoding method of claim 2, wherein the reduced boundary samples are downsampled by averaging the reference samples, and
wherein the intra prediction samples are upsampled by linear interpolation of the reduced prediction samples.

4. An image encoding method performed by an encoding apparatus, the method comprising:
deriving whether matrix-based intra prediction (MIP) is applied to a current block;
deriving intra prediction samples for the current block based on determining that the MIP is applied to the current block;
deriving residual samples for the current block based on the intra prediction samples;
generating residual information based on the residual samples; and
generating a bitstream by encoding the residual information and information on the MIP,
wherein the information on the MIP comprises first flag information related to whether the MIP is enabled, second flag information related to whether the MIP is applied to the current block and MIP mode information which is index information related to an MIP matrix for the current block,
wherein the MIP matrix is derived based on a size of the current block and the index information,
wherein the intra prediction samples is derived based on the MIP matrix,
wherein a syntax element bin string for the MIP mode information is binarized by a truncated binarization method,
wherein a maximum length of the syntax element bin string is set to different three values based on the size of the current block, and
wherein based on a width and a height of the current block being 4, the maximum length has a largest value.

5. The image encoding method of claim 4, wherein the generating of the intra prediction samples comprises:
deriving reduced boundary samples by downsampling reference samples adjacent to the current block;
deriving reduced prediction samples based on a multiplication operation of the reduced boundary samples and an MIP matrix; and
generating the intra prediction samples for the current block by upsampling the reduced prediction samples.

6. The image encoding method of claim 5, wherein the reduced boundary samples are downsampled by averaging the reference samples, and
wherein the intra prediction samples are upsampled by linear interpolation of the reduced prediction samples.

7. A non-transitory computer-readable digital storage medium that stores a bitstream generated by the image encoding method of claim 4.

8. A transmitting method of data for an image, the method comprising:
obtaining a bitstream for the image, wherein the bitstream is generated based on deriving whether matrix-based intra prediction (MIP) is applied to a current block, deriving intra prediction samples for the current block based on determining that the MIP is applied to the current block, deriving residual samples for the current block based on the intra prediction samples, generating residual information based on the residual samples, and generating a bitstream by encoding the residual information and information on the MIP; and
transmitting the data comprising the bitstream,
wherein the information on the MIP comprises first flag information related to whether the MIP is enabled, second flag information related to whether the MIP is applied to the current block and MIP mode information which is index information related to an MIP matrix for the current block,
wherein the MIP matrix is derived based on a size of the current block and the index information,
wherein the intra prediction samples is derived based on the MIP matrix,
wherein a syntax element bin string for the MIP mode information is binarized by a truncated binarization method,
wherein a maximum length of the syntax element bin string is set to different three values based on the size of the current block, and
wherein based on a width and a height of the current block being 4, the maximum length has a largest value.

* * * * *